US008520636B2

(12) United States Patent
Xu

(10) Patent No.: US 8,520,636 B2
(45) Date of Patent: Aug. 27, 2013

(54) METHOD AND APPARATUS FOR PERFORMING HANDOVER

(75) Inventor: Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 13/068,221

(22) Filed: May 5, 2011

(65) Prior Publication Data

US 2011/0274086 A1    Nov. 10, 2011

(30) Foreign Application Priority Data

May 7, 2010   (CN) .......................... 2010 1 0175839

(51) Int. Cl.
*H04W 4/00* (2009.01)
*H04W 36/00* (2009.01)

(52) U.S. Cl.
USPC ......................................... 370/331; 455/438

(58) Field of Classification Search
None
See application file for complete search history.

(56) References Cited

U.S. PATENT DOCUMENTS

| 2005/0047530 | A1* | 3/2005 | Lee et al. ........................ 375/343 |
| 2006/0291416 | A1* | 12/2006 | Rexhepi et al. ................. 370/331 |
| 2009/0258631 | A1* | 10/2009 | Forsberg et al. ............... 455/411 |
| 2010/0091653 | A1 | 4/2010 | Koodli et al. |
| 2010/0120434 | A1 | 5/2010 | Hasegawa |
| 2010/0248723 | A1* | 9/2010 | Yasuoka ......................... 455/436 |
| 2011/0045834 | A1* | 2/2011 | Kim et al. ....................... 455/438 |
| 2011/0281584 | A1* | 11/2011 | Sander et al. .................. 455/436 |
| 2012/0252436 | A1* | 10/2012 | Ostrup et al. ................ 455/422.1 |

FOREIGN PATENT DOCUMENTS

KR      20100033417 A      3/2010

OTHER PUBLICATIONS

ETSI TS 133 401 v8.2.1, Jan. 2009, pp. 32-33 and 51.*
U.S. Appl. No. 61/302,157, Mobility for Selected IP Traffic Offloading via Macro Cell, Feb. 7, 2010, p. 12.*
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300, V9.3.0, Mar. 2010, 166 pages.
International Search Report dated Nov. 28, 2011 in connection with International Patent Application No. PCT/KR2011/003347.

* cited by examiner

*Primary Examiner* — Chirag Shah
*Assistant Examiner* — Ashley Shivers

(57) ABSTRACT

A method and an apparatus perform a handover using the X2 interface. A source base station transmits a handover requirement message, for a handover to a destination base station of a user equipment (UE), to a source base station gateway. When a handover command message indicating performing of the handover to a destination base station of the UE is received from the source base station gateway, the handover command message is transmitted to the UE. When a UE context release command message is received from the source base station gateway, a context of the UE is released. And a UE context release completion message, representing that the context of the UE is released, is transmitted to the source base station gateway. The handover requirement message includes a Next-hop Chaining Counter (NCC) and an encryption key for a communication between the UE and the destination base station.

20 Claims, 14 Drawing Sheets

METHOD AND APPARATUS FOR PERFORMING HANDOVER

CROSS-REFERENCE TO RELATED APPLICATION(S) AND CLAIM OF PRIORITY

The present application is related to and claims the benefit under 35 U.S.C. §119(a) to a Chinese patent application filed in the Chinese Intellectual Property Office on May 7, 2010, and assigned Serial No. 201010175839.0, the entire disclosure of which is hereby incorporated by reference.

TECHNICAL FIELD OF THE INVENTION

The present invention relates to mobile communication technologies, and particularly to a method and an apparatus for performing a handover.

BACKGROUND OF THE INVENTION

In a current mobile communication system, in order to provide a user group with better service, it is often required to combine multiple wireless resource management entities (i.e. network entities for managing a wireless resource and being responsible for access of User Equipment (UE) in a wireless access network, e.g. a cell or abase station in various mobile communication systems) into a Closed Subscriber Group (CSG) with respect to the particular user group. For example, only users within a company or school are included in a particular user group, and multiple wireless resource management entities are combined into a CSG with respect to the user group, so as to provide a specialized access service. Combining multiple wireless resource management entities into the CSG with respect to a particular user group is common in the mobile communication system. In order to explain this situation more clearly, a Long Term Evolution (LTE) system of System Architecture Evolution (SAE) is taken as an example for the explanation below.

FIG. 1 is a schematic diagram of a structure of an LTE system in the prior art. As shown in the FIG. 1, in the wireless access network of the LTE system, the wireless resource management entity includes a macro base station (eNB) 102 and a home base station (HeNB) 103, and a home base station gateway (HeNB GW) 104 is optionally included in the wireless access network. The eNB 102 can be directly connected with a Mobile Management Entity (MME) 105 in a core network. When the HeNB GW 104 is included in the wireless access network, the HeNB 103 is connected with the MME 105 through the HeNB GW 104. When the HeNB GW 104 is not included in the wireless access network, the HeNB 103 can be directly connected with the MME 105.

For the wireless resource management entity in the LTE system, in order to provide more access, multiple types of HeNBs, which include an opened type, a hybrid type and a CSG type, are provided in the prior art, taking the HeNB as an example. Specifically, there is no particular accessed user group for the HeNB of the opened type, and any UE can have the access. The HeNB of the CSG type is just the HeNB used by the above-mentioned user group constructed by all the users inside a company or school, and allows only the UE in the particular user group (in order to facilitate description, the UE in the particular user group is briefly referred to as CSG UE in the following) served by it to have the access. The HeNB of the hybrid type not only constructs the CSG with another HeNB to allow the CSG UE served by it to have the access so as to provide a much better access service with respect to the CSG UE, but also can allow another non-CSG UE (a UE that does not belong to the CSG) to have the access.

It can be seen from the above description that in the existing mobile communication system, for the wireless resource management entity, not only multiple wireless resource management entities can construct the CSG to provide the wireless resource management entity of the CSG type, e.g. the HeNB of the CSG type, but also the wireless resource management entity of the hybrid type, e.g. the HeNB of the hybrid type, can be used to provide more access services. Meanwhile, the eNB can also support a function of the CSG, or be used as the eNB of the hybrid type when supporting the function of the CSG.

In the prior art, at any time that the UE moves between the HeNBs (or between the eNB and the HeNB), an S1 handover process is performed. As shown in FIG. 2, it is easy to understand that an optional process description already known by those skilled in the art is omitted in the following, and the S1 handover process mainly includes:

Step 201: A S-(H)eNB as a source eNB or HeNB transmits a handover requirement message to the HeNB gateway (GW).

Step 202: The HeNB GW transmits the handover requirement message to the MME.

Step 203: The MME transmits a handover request message to the HeNB GW, and the HeNB GW transmits the handover request message to a T-(H)eNB as a destination eNB or HeNB.

Step 204: The T-(H)eNB allocates the resource and transmits a handover request acknowledgement message to the HeNB GW, and the HeNB GW transmits the handover request acknowledgement message to the MME.

Step 205: The MME transmits a handover command message to the HeNB GW, and the HeNB GW transmits the handover command message to the S-(H)eNB.

Step 206: The S-(H)eNB transmits a handover command message to the UE.

Step 207: The UE is synchronized with a destination cell, and transmits a handover acknowledgement message to the T-(H)eNB.

Step 208: The T-(H)eNB transmits a handover notification message to the HeNB GW, and the HeNB GW transmits the handover notification message to the MME.

Step 209: The MME transmits a bearer update request message for bearer modification to a Serving Gateway/Packet Data Network Gateway (S-GW/PDN GW) (here, a signaling procedure between the S-GW and the PDN GW is omitted). Specifically, the S-GW mainly provides the function of a user plane. The PDN GW is responsible for the function such as billing, lawful interception, and such. According to context information of the UE, if the PDN GW requests the UE to report a position and/or CSG information of the user, the MME causes an information element of the CSG of the user and the position of the UE to be included in the bearer update request message.

Step 210: The S-GW/PDN GW transmits a bearer update response message to the MME.

Step 211: The UE initiates a Trunk Access Unit (TAU) process.

Step 212: The MME transmits a UE context release command message to the HeNB GW, and the HeNB GW transmits the UE context release command message to the S-(H) eNB.

Step 213: The S-(H)eNB transmits a UE context release completion message to the HeNB GW, and the HeNB GW transmits the UE context release completion message to the MME.

The S-(H)eNB and the T-(H)eNB in FIG. 2 are used in order to allow the procedure described above to be applied to the S1 handover when the UE moves between the eNBs or moves between the eNB and the HeNB. Therefore, the S-eNB represents a source eNB, the T-eNB represents a target (i.e. destination) eNB, while the S-HeNB represents the source HeNB and the T-HeNB represents the destination HeNB. When the S-(H)eNB or the T-(H)eNB is the macro base station eNB, the HeNB GW does not exist, and the S-(H)eNB or the T-(H)eNB communicates with the MME.

It can be found that when an amount of the HeNB (or the eNB) is relatively large, if the handover method described above is used and the UE carries out every handover between the HeNBs or the eNBs using the S1 handover, the core network may suffer an extremely heavy burden, thus an efficiency of the handover is greatly decreased.

In this situation, performing the handover using an X2 interface is a feasible alternative solution. However, there is no solution at present that the HeNB uses the X2 handover in the prior art. If only an existing X2 handover process is used for the HeNB, complexity of the HeNB may be increased. If an architecture of the X2 interface is used between the GWs or between the GW and the eNB, how to establish the X2 interface between the GWs or between the GW and the eNB is also a pending problem in the prior art. In addition, in performing the X2 handover using the GW, there are also some security problems that an existing security mechanism cannot address.

SUMMARY OF THE INVENTION

To address the above-discussed deficiencies of the prior art, it is a primary object to provide a method and an apparatus for performing a handover using a gateway, which can realize that when the handover is performed using the X2 interface, it is only required that the HeNB supports an S1 protocol to reduce the burden caused on the core network by the handover process.

In order to achieve the object described over, technical solutions of the present invention are specifically implemented as follows.

A method for performing a handover by a source base station is provided. A handover requirement message for a handover to a destination base station of a user equipment (UE) is transmitted to a source base station gateway. When a handover command message indicating performing of the handover to a destination base station of the UE is received from the source base station gateway, the handover command message is transmitted to the UE. When a UE context release command message is received from the source base station gateway, a context of the UE is released. And a UE context release completion message, representing that the context of the UE is released, is transmitted to the source base station gateway. The handover requirement message includes a Next-hop Chaining Counter (NCC) and an encryption key for a communication between the UE and the destination base station. The NCC and the encryption key are transmitted to the destination base station from a destination base station gateway, after the NCC and the encryption key are delivered to the destination base station gateway from the source base station gateway.

A method for performing a handover by a destination base station is provided. A handover request message is received from a destination base station gateway. The handover request message represents a message for requesting a handover to the destination base station of a user equipment (UE) that is receiving a service from a source base station. A resource is allocated to the UE. A handover request acknowledgement message is transmitted to the destination base station gateway. The handover request acknowledgement message indicates that the handover to the destination base station of the UE is possible. When a handover acknowledgement message, which indicates that the handover to the destination base station of the UE is to be performed, is received from the UE, a handover notification message for notifying the handover of the UE is transmitted to the destination base station gateway. The handover request message includes a Next-hop Chaining Counter (NCC) of the source base station and an encryption key for a communication between the UE and the destination base station. The NCC and the encryption key are transmitted to the destination base station gateway from a source base station gateway, after the NCC and the encryption key are delivered to the source base station gateway from the source base station.

A source base station is provided. The source base station includes a receiver, a controller, and a transmitter. The receiver receives a handover command message, indicating a performing of a handover to a destination base station of a user equipment (UE), from a source base station gateway, and receives a UE context release command message from a source base station gateway. The controller releases a context of the UE when the UE context release command message is received from the source base station gateway. The transmitter transmits to the source base station gateway a handover requirement message for the handover to the destination base station of the UE, transmits the handover command message to the UE when the handover command message is received from the source base station gateway, and transmits to the source base station gateway a UE context release completion message representing that the context of the UE is released when the context of the UE is released according to a reception of the UE context release command message. The handover requirement message includes a Next-hop Chaining Counter (NCC) and an encryption key for a communication between the UE and the destination base station. The NCC and the encryption key are transmitted to the destination base station from a destination base station gateway, after the NCC and the encryption key are delivered to the destination base station gateway from the source base station gateway.

A destination base station is provided. The destination base station includes a receiver, a controller, and a transmitter. The receiver receives a handover request message from a destination base station gateway, the handover request message representing a message for requesting a handover to the destination base station of a user equipment (UE) receiving a service from a source base station, and receives a handover acknowledgement message from the UE, the handover acknowledgement message indicating that the handover to the destination base station of the UE is to be performed. The controller allocates a resource to the UE when the handover request message is received. The transmitter transmits a handover request acknowledgement message to the destination base station gateway when the resource is allocated to the UE, the handover request acknowledgement message indicating that the handover to the destination base station of the UE is possible, and transmits to the destination base station gateway a handover notification message for notifying the handover of the UE when the handover acknowledgement message is received. The handover request message includes a Next-hop Chaining Counter (NCC) of the source base station and an encryption key for a communication between the UE and the destination base station. The NCC and the encryption key are transmitted to the destination base station gateway from a source base station gateway, after the NCC and the encryption key are delivered to the source base station gateway from the source base station.

It can be seen from the technical solutions described above that, with the method and the apparatus for performing the X2 handover through the gateway provided by embodiments of the present invention, the handover can be implemented on only the premise that the home base station needs to support the S1 protocol, a cost of the home base station is decreased, an interaction of the handover process with the core network is reduced, and an influence on the core network by the handover process is decreased.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. In order to make the objects, technical solutions and advantages of the present invention more apparent, the present invention is described in further detail in the following with reference to the accompanying drawings and in combination with the embodiments.

Figure 1:
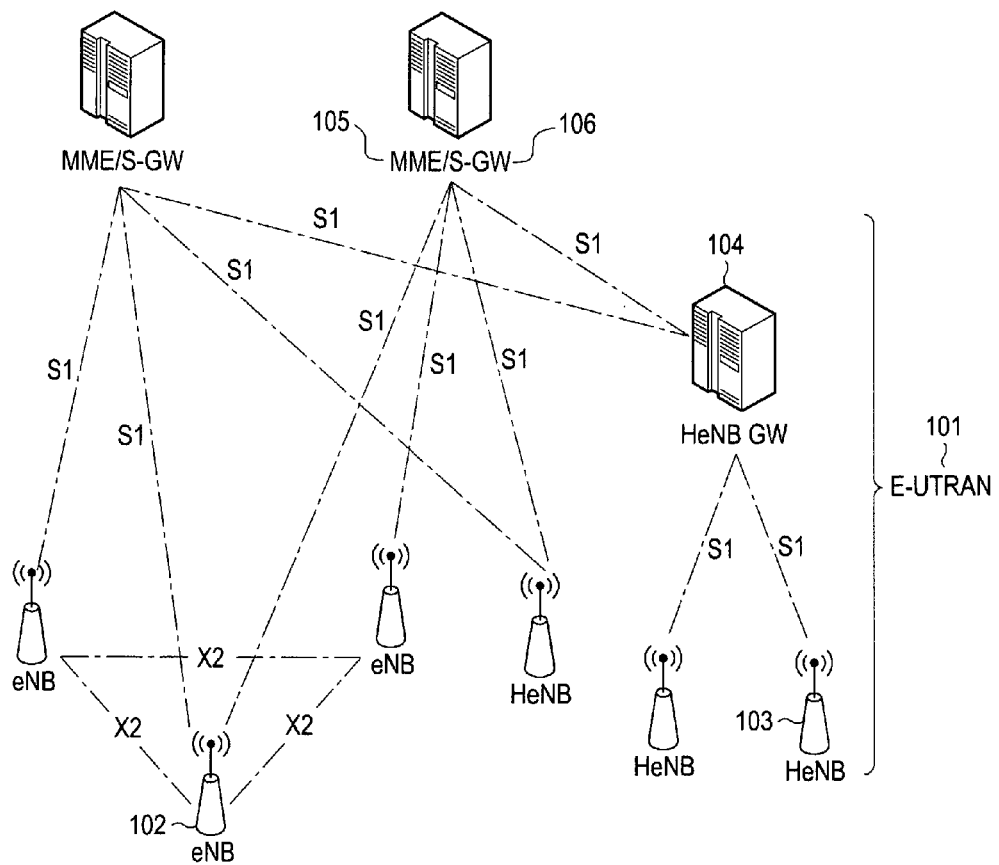
FIG. 1 is a schematic diagram of an LTE system in the prior art.
Figure 2:
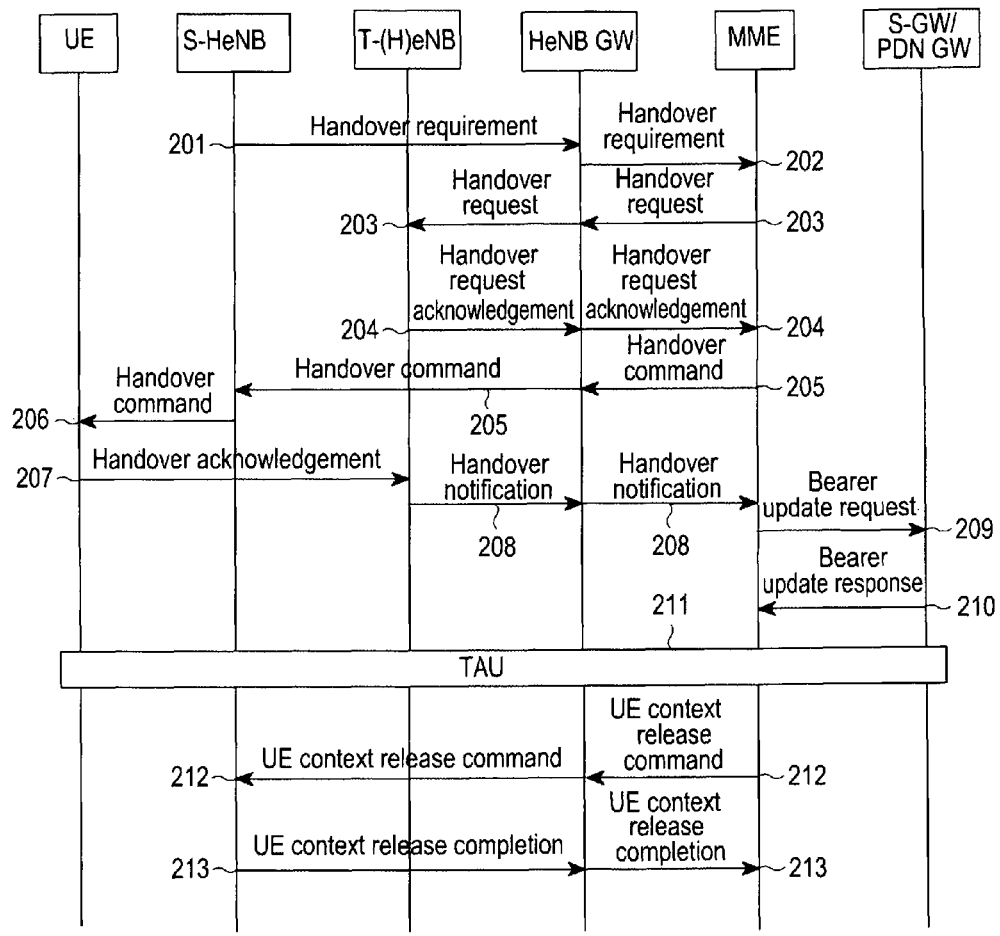
FIG. 2 is a schematic diagram of a handover process between HeNBs in the prior art.
Figure 3:
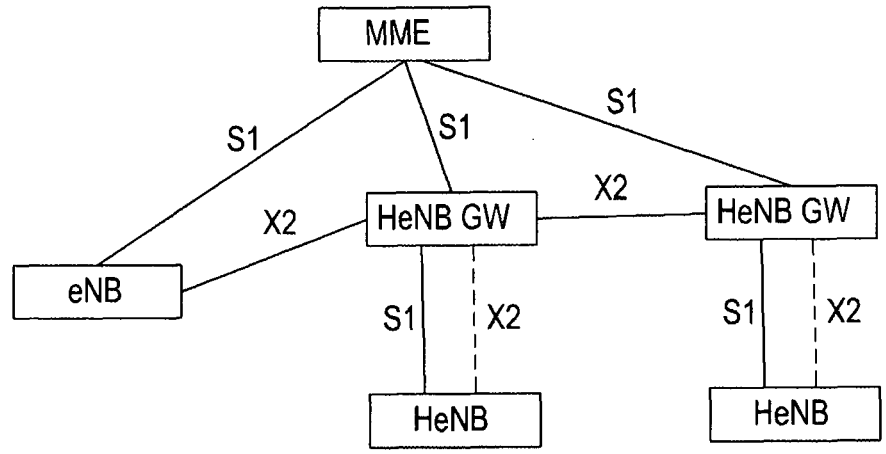
FIG. 3 is a schematic diagram of a system architecture for performing an X2 handover using a gateway according to an embodiment of the present invention.

FIG. 3 is a schematic diagram of a system architecture for performing the X2 handover using the gateway according to an embodiment of the present invention. Specifically, the HeNB GW and the eNB access a mobile management entity of the core network (the MME in the LTE) using an S1 interface. There is a direct connection through the X2 interface between the HeNB GWs and between the HeNB GW and the eNB, and an X2 protocol stack is used. There is a connection through the S1 interface between the HeNB and the HeNB GW, and the S1 protocol stack is used. There is no X2 interface between the HeNBs and between the HeNB and the eNB.

As another implementation solution of the present invention, the HeNB accesses the core network using the S1 interface through the HeNB GW. The communication between the HeNB and the neighboring HeNB or eNB is carried out using the X2 interface through the HeNB GW, and the X2 protocol stack is used (e.g. handover signaling is transmitted to the neighboring HeNB or eNB using the X2 protocol between the HeNB and the HeNB GW).

Figure 4:
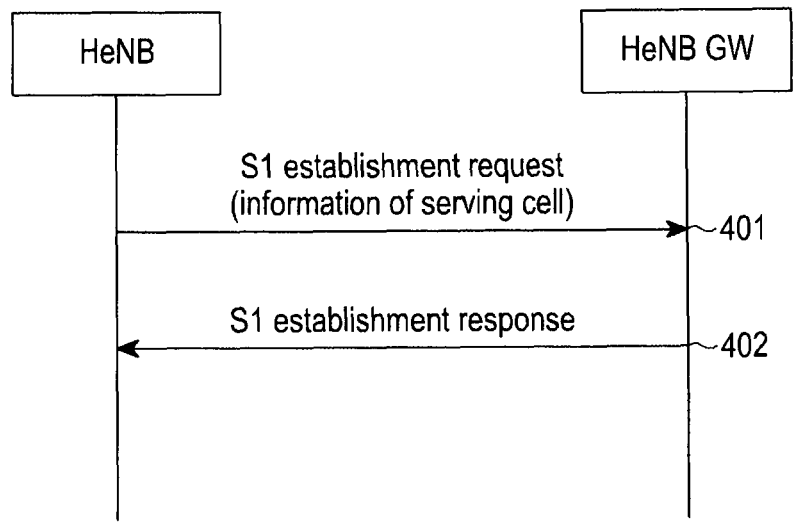
FIG. 4 is a schematic diagram of an S1 establishment process between the HeNB and an HeNB GW according to an embodiment of the present invention.

FIG. 4 is a schematic diagram of an S1 interface (hereinafter 'S1') establishment process between the HeNB and an HeNB GW according to an embodiment of the present invention.

Step 401: The HeNB transmits an S1 establishment request message to the HeNB GW. Information of a serving cell is included in the S1 establishment request message. The information of the serving cell includes a Physical Cell Identifier (PCI), an E-UTRAN (Evolved Universal Terrestrial Radio Access Network) Cell Global Identifier (ECGI), a Tracking Area Code (TAC) and a broadcasted Public Land Mobile Network (PLMN) (one or more PLMN identifiers).

The information of the serving cell includes an information element of an antenna port amount. The information of the serving cell also includes the information element of a Physical Random Access Channel (PRACH) configuration. The antenna port amount and the PRACH are optional information elements. If a Frequency Division Duplex (FDD) scheme is used, an uplink E-UTRA (Evolved Universal Terrestrial Radio Access) Absolute Radio Frequency Channel Number (EARFCN) and a downlink EARFCN, an uplink transmission bandwidth, and a downlink transmission bandwidth are also included in the information of the serving cell. If a Time Division Duplex (TDD) scheme is used, the EARFCN, the transmission bandwidth, sub-frame allocation information, and special sub-frame information are also included in the information of the serving cell. The special sub-frame information is, for example, a special sub-frame pattern, Cyclic Prefix Downlink, and Cyclic Prefix Uplink.

The information of the serving cell in the S1 establishment request message also includes the information of the neighboring cell of the serving cell. The information of the neighboring cell of the serving cell is an optional information element. The information of the neighboring cell of the serving cell includes the ECGI, the PCI and the EARFCN (the downlink for the FDD, and the EARFCN for the TDD).

Step 402: The HeNB GW stores the received information and, transmits an S1 establishment response message to the HeNB.

FIGS. 5 to 8 illustrate different processes for establishing the X2 interface between the HeNB GWs and between the HeNB GW and the eNE, according to an embodiment of the present invention. The X2 interface establishment method can be used for two situations for which the S1 and the X2 interfaces for the handover signaling between the HeNB and the HeNB GW are used.

Figure 5:
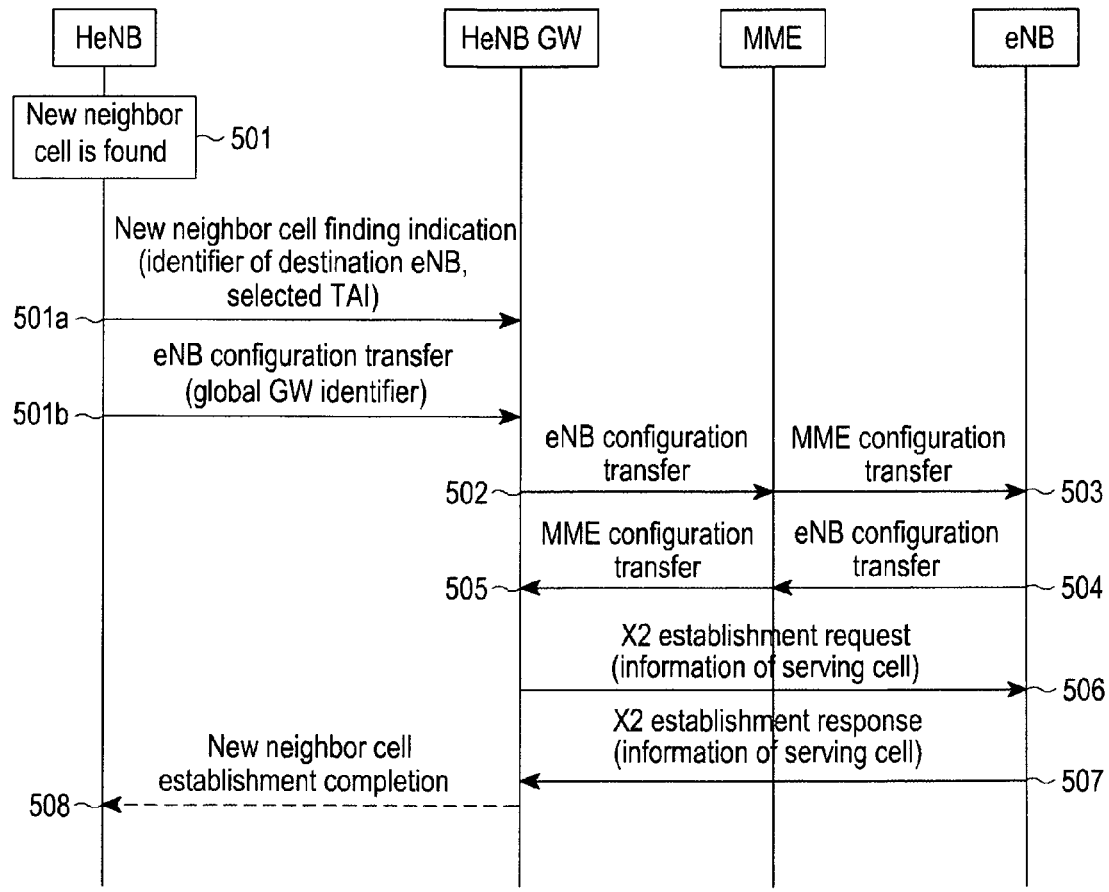
FIG. 5 is a schematic diagram of a process through which the HeNB GW obtains an IP address of a neighboring eNB and establishes an X2 interface connection according to an embodiment of the present invention.

FIG. 5 is a schematic diagram of one process through which the HeNB GW obtains an Internet Protocol (IP) address of the neighboring eNB and establishes the X2 interface according to an embodiment of the present invention.

Step 500: The HeNE finds a new neighbor cell based on a report from the UE, and the new neighbor cell is at a new eNB.

Step 501: The HeNB transmits a new neighbor cell finding indication message to the HeNB GW (i.e. 501a in the FIG. 5), where the new neighbor cell finding indication message includes an identifier (including a global eNB identifier and a selected Tracking Area Identify (TAI) of the destination eNB. Alternatively, the HeNB transmits an eNB configuration transfer message to the HeNB GW (i.e. 501b in the FIG. 5), where the eNB configuration transfer message includes the identifier of the source eNB, the identifier of the destination eNB, and Self-Organizing Network (SON) information. The identifier of the source eNB is set as the identifier of the GW and the selected TAI. The SON information is set as an information request, to request X2 transport layer configuration information.

Preferably, the HeNB stores the information of the eNB of the neighbor cell in advance, and the HeNB triggers Step 501 only upon determining that the HeNB GW does not establish the X2 interface with the eNB of the neighbor cell. Corresponding to such an optimized solution, it is required to inform the HeNB after the HeNB GW successfully establishes the X2 interface with the eNB of the neighbor cell, (i.e. a response/acknowledgement/notification message of Step 508 is required).

Step 502: In response to receiving the identifier of the destination eNB according to Step 501a, the HeNB GW transmits the eNB configuration transfer message to the MME. The identifier of the source eNB, the identifier of the destination eNB, and the SON information are included in the eNB configuration transfer message. The identifier of the source eNB is set as a global GW identifier and the selected TAI. The SON information is set as the information request, to request X2 transport layer configuration information. Alternatively, in response to receiving the global GW identifier according to Step 501b, the HeNB GW transmits the received eNB configuration transfer message to the MME.

Step 503: The MME finds the destination eNB according to the identifier of the destination eNB (including the global eNB identifier and the selected TAI), and transmits an MME configuration transfer message to the destination eNB.

Step 504: The destination eNB transmits the eNB configuration transfer message to the MME. The eNB configuration transfer message includes the identifier of the source eNB and the identifier (GW identifier) of the destination eNB and the SON information. The SON information includes a SON information response, and the SON information response includes a transport layer address of the destination eNB. The identifier of the destination eNB is set as the global GW identifier and the selected TAI.

Step 505: The MME transmits the MME configuration transfer message to the HeNB GW.

Step 506: The HeNB GW transmits an X2 establishment request message for requesting establishment of the X2 interface to the destination eNB. The X2 establishment request message includes the information of the serving cell.

Step 507: The destination eNB transmits an X2 establishment response message to the HeNB GW. The X2 establishment response message includes the information of the serving cell.

Step 508: The HeNB GW transmits a new neighbor cell establishment completion message or new neighbor cell establishment notification message to the HeNB. The new neighbor cell establishment completion message and the new neighbor cell establishment notification message include the identifier of the destination eNB of the newly established neighbor cell, and the selected TAI. The message transmitted in step 508 may be either a response message for step 501, or a separate indication message. Step 508 is an optional step, i.e. the process through which the HeNB GW obtains the IP address of the neighboring eNB and establishes the X2 interface includes two technical solutions: one that includes step 508 and another that does not include step 508.

Figure 6:
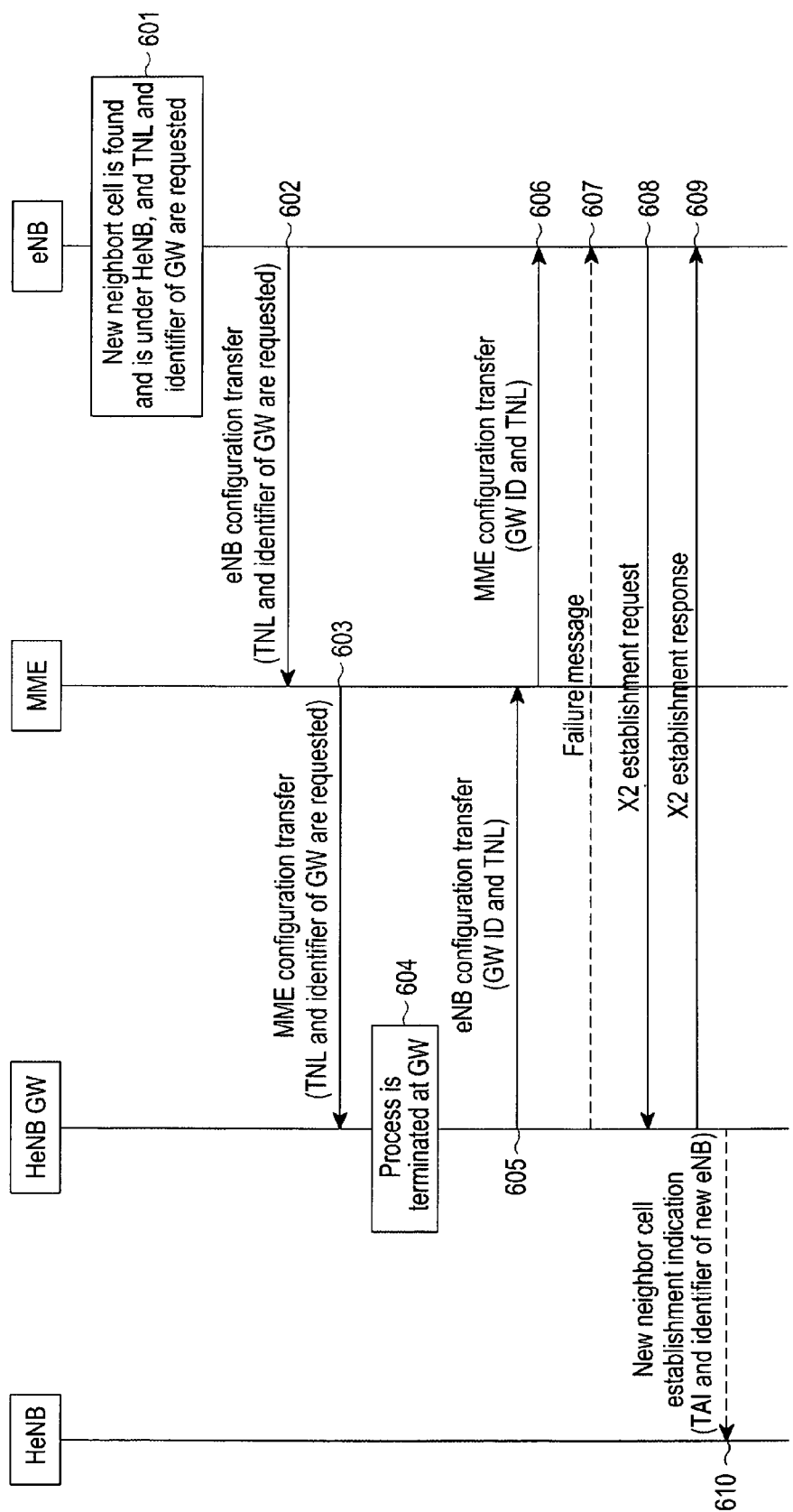
FIG. 6 is a schematic diagram illustrating another process through which the eNB obtains the IP address of the neighboring HeNB GW and establishes the X2 interface connection according an embodiment of to the present invention.

FIG. 6 is a schematic diagram of another process through which the HeNB GW obtains the IP address of the neighboring eNB and establishes the X2 interface according to an embodiment of the present invention.

Step 601: The eNB finds the new neighbor cell, and the new neighbor cell is under the HeNB. The eNB knows that the destination cell is the cell of the HeNB according to the PCI of the new neighbor cell, a code of the cell identifier of the new neighbor cell, the code of the identifier of the eNB where the new neighbor cell is located, the configuration of an operator, or another method. The eNB decides to request the X2 transport layer address (TNL) of the base station gateway where the new neighbor cell is located.

Step 602: The eNB requests the X2 transport layer address of the base station gateway of the new neighbor cell and the identifier of the GW. The eNB sets the global eNB identifier for the identifier of the destination eNB as a global HeNB identifier, or sets the identifier of the destination eNB as being not present or as a certain special value. Corresponding to null or the special value, the destination base station gateway sets the identifier of an opposite end as a source identifier to respond back in the response message. The SON information request is set as the X2 TNL configuration information and the identifier of the GW. The eNB transmits the eNB configuration transfer message to the MME.

Step 603: The MME transmits the MME configuration transfer message to the HeNB GW. A setting of the information element in the MME configuration transfer message is substantially the same according to Step 602.

Step 604: The HeNB GW terminates the process at the GW, i.e. does not transmit the message to the HeNB.

Step 605: The HeNB GW transmits the eNB configuration transfer message to the MME.

There are two approaches for Step 605. In the first approach, the identifier of the source eNB in the eNB configuration transfer message is the global HeNB identifier and the selected TAI, the SON information is set as an information answer, and the information answer is the X2 TNL configuration information of the GW and the global GW identifier. In the second approach, the identifier of the source eNB in the eNB configuration transfer message is a global HeNB GW identifier and the selected TAI, the SON information is set as the information answer, and the information answer is the X2 TNL configuration information of the GW.

Step 606: The MME transmits the MME configuration transfer message to the eNB, where the setting of the information element in the MME configuration transfer message is substantially the same as in step 605.

Step 607: Optionally, if a node receiving the request for the identifier of the GW is not the GW, the node transmits a failure message to the source eNB.

Step 608: The eNB transmits the X2 establishment request message to the HeNB GW, where the X2 establishment request message includes the information of the serving cell.

Step 609: The HeNB GW transmits the X2 establishment response message to the eNB, where the X2 establishment response message includes the information of the serving cell.

Step 610: The HeNB GW transmits a new neighbor cell establishment indication message to the HeNB, where the message includes the identifier of the eNB of the newly established neighbor cell and the selected TAI. Step 610 is optional. Corresponding to this process, it is required to set the global eNB identifier for the identifier of the destination eNB as the global HeNB identifier in step 602, and the HeNB GW transmits the new neighbor cell establishment indication message to the HeNB corresponding to the identifier of the HeNB.

Figure 7:
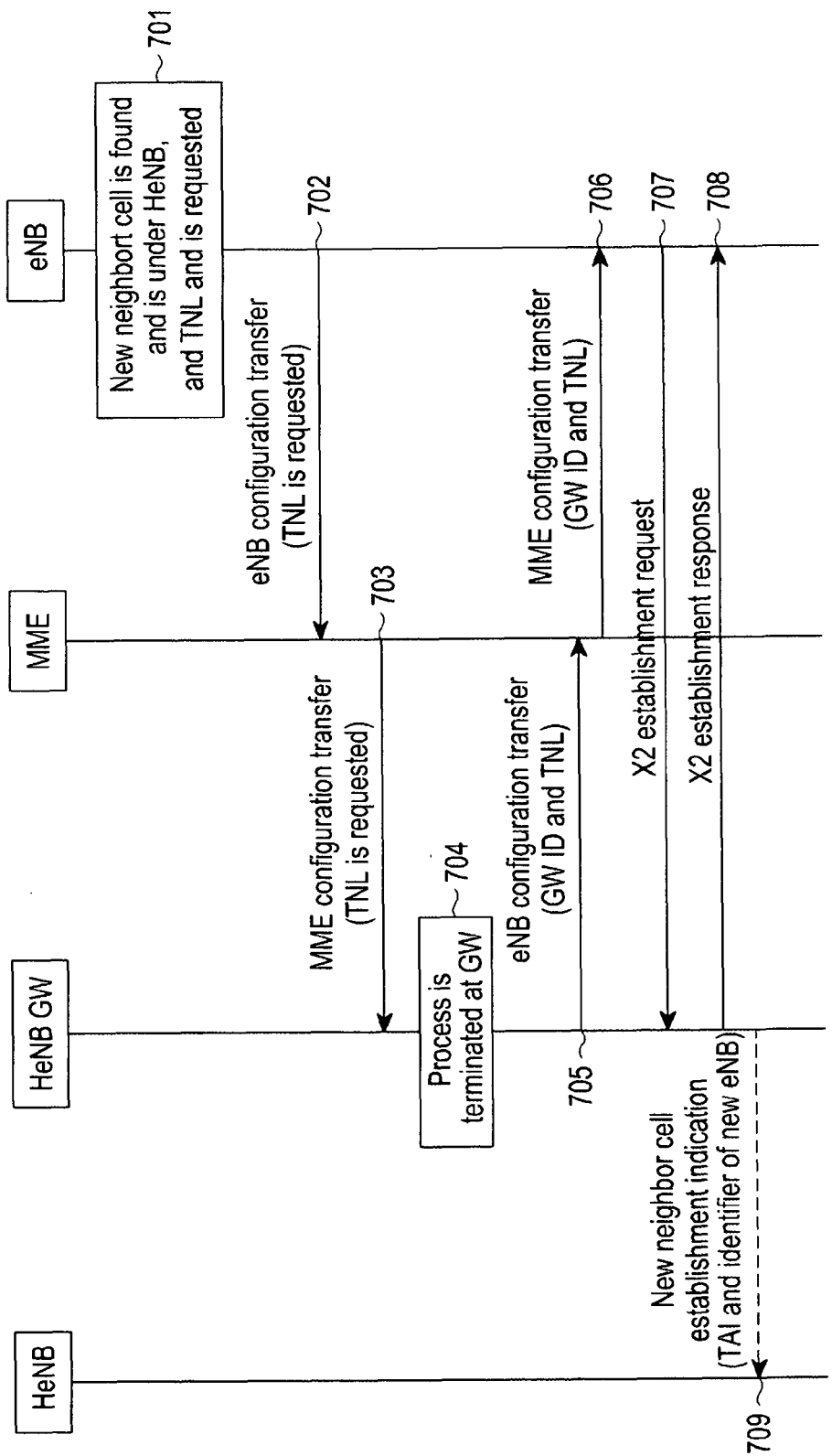
FIG. 7 is a schematic diagram of another process through which the eNB obtains the IP address of the neighboring HeNB GW and establishes the X2 interface connection according to an embodiment of the present invention.

FIG. 7 illustrates another process through which the eNB obtains the IP address of the neighboring HeNB GW and establishes the X2 interface according to an embodiment of the present invention.

Step 701: The eNB finds the new neighbor cell, and the new neighbor cell is under the HeNB. The eNB knows that the destination cell is the cell of the HeNB according to the PCI of the new neighbor cell, a code of the cell identifier of the new neighbor cell, the code of the identifier of the eNB where the new neighbor cell is located, the configuration of an operator, or another method. The eNB decides to request the X2 TNL of the base station gateway where the new neighbor cell is located.

Step 702: The eNB requests the X2 TNL of the base station gateway of the new neighbor cell. The eNB sets the identifier of the destination eNB as the identifier of the HeNB, or sets the identifier of the destination eNB as the identifier of the GW (one way for the eNB to know the identifier of the GW is to know the identifier of the GW where the destination cell is located according to the TAI of the neighbor cell, and corresponding to this method, the eNB needs to store a TAI list corresponding to the neighboring gateway, and the eNB can also know the identifier of the GW where the destination cell is located through another way), or sets the identifier of the destination eNB as being not present or as a certain special value. Corresponding to a null or special value, the destination base station gateway sets the identifier of an opposite end as a source identifier to respond back in the response message. The SON information request is set as the X2 TNL configuration information. The eNB transmits the eNB configuration transfer message to the MME.

Step 703: The MME transmits the MME configuration transfer message to the HeNB GW. A setting of the information element in the MME configuration transfer message is substantially the same as according to step 702.

Step 704: The HeNB GW terminates the process at the GW, i.e. the HeNB GW does not transmit the MME configuration transfer message to the HeNB.

Step 705: The HeNB GW transmits the eNB configuration transfer message to the MME. The identifier of the source eNB in the message is the global GW identifier or the global HeNB identifier and the selected TAI. The information answer of the SON information is the X2 TNL configuration information of the GW. The X2 TNL configuration information is the TNL of the GW.

Step 706: The MME transmits the MME configuration transfer message to the eNB, where the setting of the information element in the MME configuration transfer message is substantially the same as step 705.

Step 707: The eNB transmits the X2 establishment request message to the HeNB GW, where the X2 establishment request message includes the information of the serving cell.

Step 708: The HeNB GW transmits the X2 establishment response message to the eNB, where the X2 establishment response message includes the information of the serving cell.

Step 709: The HeNB GW transmits a new neighbor cell establishment indication message to the HeNB, where the new neighbor cell establishment indication message includes the identifier of the eNB of the newly established neighbor cell and the selected TAI. Step 709 is optional. Corresponding to this method, it is required to set the global eNB identifier for the identifier of the destination eNB as the global HeNB identifier in step 702. Additionally, the HeNB GW transmits the new neighbor cell establishment indication message to the HeNB corresponding to the identifier of the HeNB.

Figure 8:
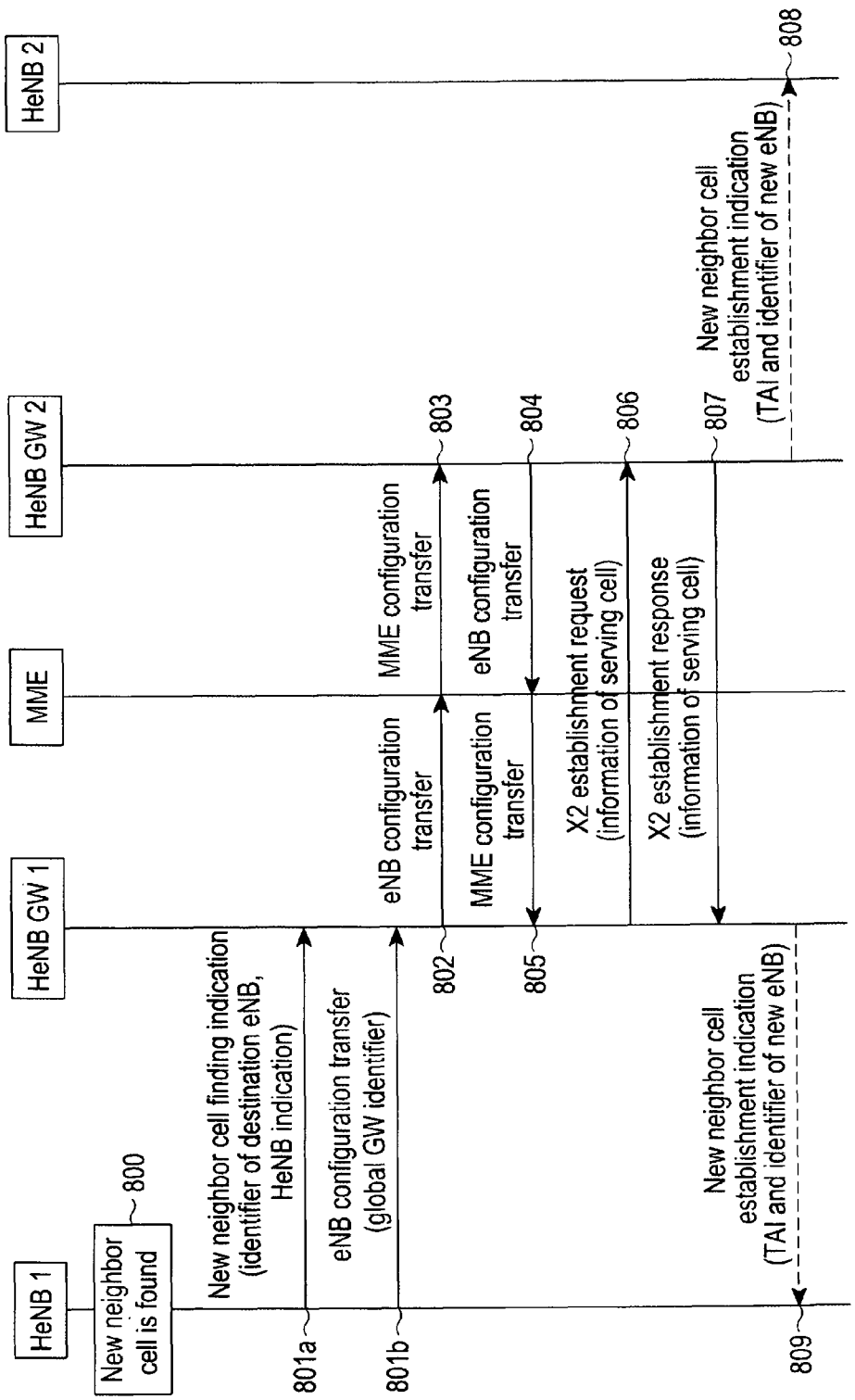
FIG. 8 is a schematic diagram of yet another process through which an HeNB GW 1 obtains the IP address of a neighboring HeNB GW 2 and establishes the X2 interface connection according to an embodiment of the present invention.

FIG. 8 illustrates yet another process through which an HeNB GW1 obtains the IP address of a neighboring HeNB GW2 and establishes the X2 interface according to an embodiment of the present invention.

Step 800: The eNB obtains information of the new neighbor cell based on the report from the UE, and the new neighbor cell is at the HeNB. A type of the base station is HeNB. The eNB knows that the destination cell is the cell of the HeNB according to the PCI of the new neighbor cell, a code of the cell identifier of the new neighbor cell, the code of the identifier of the eNB where the new neighbor cell is located, the configuration of an operator, or another method.

There are two ways for the HeNB to trigger the X2 interface establishment process of the HeNB GW1. In order to facilitate differentiation, the two ways of triggering the x2 interface establishment process are respectively referred to as step 801*a* and step 801*b*.

Step 801*a*: A HeNB1 transmits a new neighbor cell finding indication message to the HeNB GW1. The new neighbor cell finding indication message includes the identifier (including a global HeNB1 identifier or a global HeNB GW1 identifier, and the selected TAI) of the destination HeNB. The new neighbor cell finding indication message also includes an HeNB indication.

Step 801*b*: The HeNB1 transmits the eNB configuration transfer message to the HeNB GW1, where the identifier of the source eNB, the identifier of the destination eNB, and the SON information are included in the eNB configuration transfer message. The identifier of the source eNB is set as the identifier of the HeNB GW1 (a global HeNB GW1 identifier and the selected TAI). The SON information is set as the information request to request the X2 transport layer configuration information or the X2 TNL and the information of the identifier of the destination GW, or to request only the information of the X2 TNL. The identifier of the destination eNB is set as the identifier of the destination HeNB or the identifier of the destination GW. Alternatively, the identifier of the destination eNB is set as not being present or as a certain special value. Corresponding to null or the special value, the destination base station gateway sets the identifier of the base station gateway as a source identifier to respond back in the response message.

Step 802: Corresponding to Step 801*a*, the HeNB GW1 transmits the eNB configuration transfer message to the MME. The identifier of the source eNB, the identifier of the destination eNB, and the SON information are included in the eNB configuration transfer message. The identifier of the source eNB is set as the identifier of the HeNB GW1 (the global HeNB GW1 identifier, and the selected TAI). The HeNB GW1 is set as the identifier of the destination eNB according to the indication information of the HeNB. For example, if the indication information indicates the HeNB, the identifier of the destination eNB is set as the identifier of the HeNB GW, or the identifier of the destination HeNB and the information of the X2 TNL and the information of the identifier of the GW are requested. Alternatively, the identifier of the destination eNB is set as null or a special value, and the HeNB GW2 takes the identifier of the HeNB GW2 as a source identifier to respond back in the response message. The SON information is set as the information request, to request the X2 transport layer configuration information or the identifier of the destination GW and the information of the X2TNL, or to request only the information of the X2TNL.

Alternatively, corresponding to step 801*b*, step 802 at this time is as follows. The HeNB GW1 transmits the received eNB configuration transfer message to the MME.

Step 803: The MME finds the destination eNB (HeNB GW2) according to the identifier of the destination eNB (including the global eNB identifier and the selected TAI), and transmits the MME configuration transfer message to the destination eNB (HeNB GW2).

Step 804: The destination HeNB GW transmits the eNB configuration transfer message to the MME, where the eNB configuration transfer message includes the identifier of the source eNB (the identifier of the HeNB2 or the identifier of the HeNB GW2), the identifier of the destination eNB (the identifier of the HeNB GW1), and the SON information. The SON information includes the X2 transport layer configuration information of the HeNB GW2 or the X2 TNL of the HeNB GW2 and the information of the identifier of the HeNB GW2. If the identifier of the source eNB is set as the identifier of the HeNB GW2, the identifier of the HeNB GW2 does not need to be included in the responded SON information.

Step 805: The MME transmits the MME configuration transfer message to the HeNB GW1. The setting of the information is substantially the same as step 804.

Step 806: The HeNB GW1 transmits the X2 establishment request message to the HeNB GW2, where the X2 establishment request message includes the information of the serving cell.

Step 807: The HeNB GW2 transmits the X2 establishment response message to the HeNB GW1, where the X2 establishment response message includes the information of the serving cell.

Step 808: The HeNB GW2 transmits a new neighbor cell establishment indication message to the HeNB2, where the new neighbor cell establishment indication message includes the identifier of the eNB of the newly established neighbor cell (the identifier of the HeNB GW1 or the identifier of the HeNB1) and the selected TAI. Step 808 is optional. Corresponding to this process, it is required to set the global eNB identifier for the identifier of the destination eNB as the global HeNB identifier in step 802. Additionally, the HeNB GW2 transmits the new neighbor cell establishment indication message to the HeNB2 corresponding to the identifier of the HeNB.

Step 809: The HeNB GW1 transmits the new neighbor cell establishment indication message to the HeNB1, where the new neighbor cell establishment indication message includes the identifier of the eNB of the newly established neighbor cell (the identifier of the HeNB GW2 or the identifier of the HeNB2) and the selected TAI. Step 809 is optional. A separate indication message or the response message of step 801 may be used in step 809.

Figure 9:
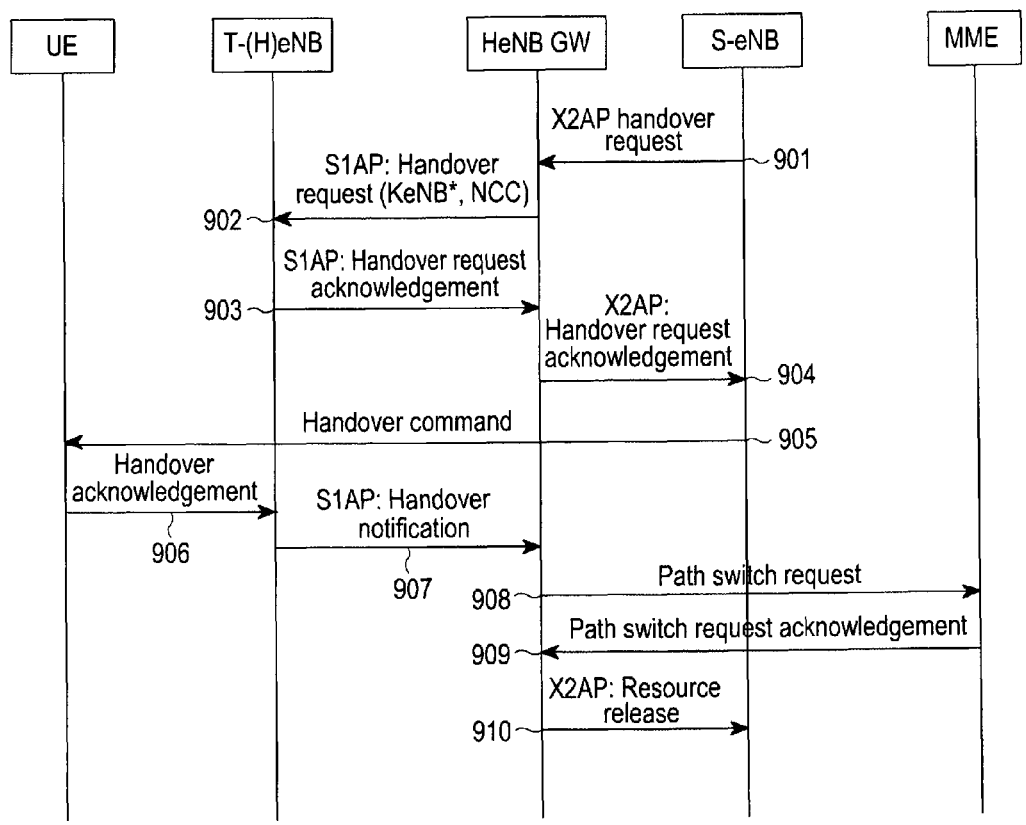
FIG. 9 is a schematic diagram of a process for performing the X2 handover using the GW according to an embodiment of the present invention.

FIG. 9 illustrates one process for performing the X2 handover using the GW according to an embodiment of the present invention.

Step 901: The S-eNB as the source eNB makes a handover decision. The S-eNB transmits an X2 Access Protocol (X2AP) handover request message to the HeNB GW. The $K_{eNB}*$ calculated by the S-eNB and a corresponding Next-hop Chaining Counter (NCC) are included in the X2AP handover request message. The $K_{eNB}*$ represents a key used to secure a communication between the UE and the T-(H)eNB as the destination eNB or HeNB, for handover process. The CSG identifier of the destination cell and the access pattern (e.g. the closed type or the hybrid type) of the destination cell are included in the X2AP handover request message.

Figure 12:
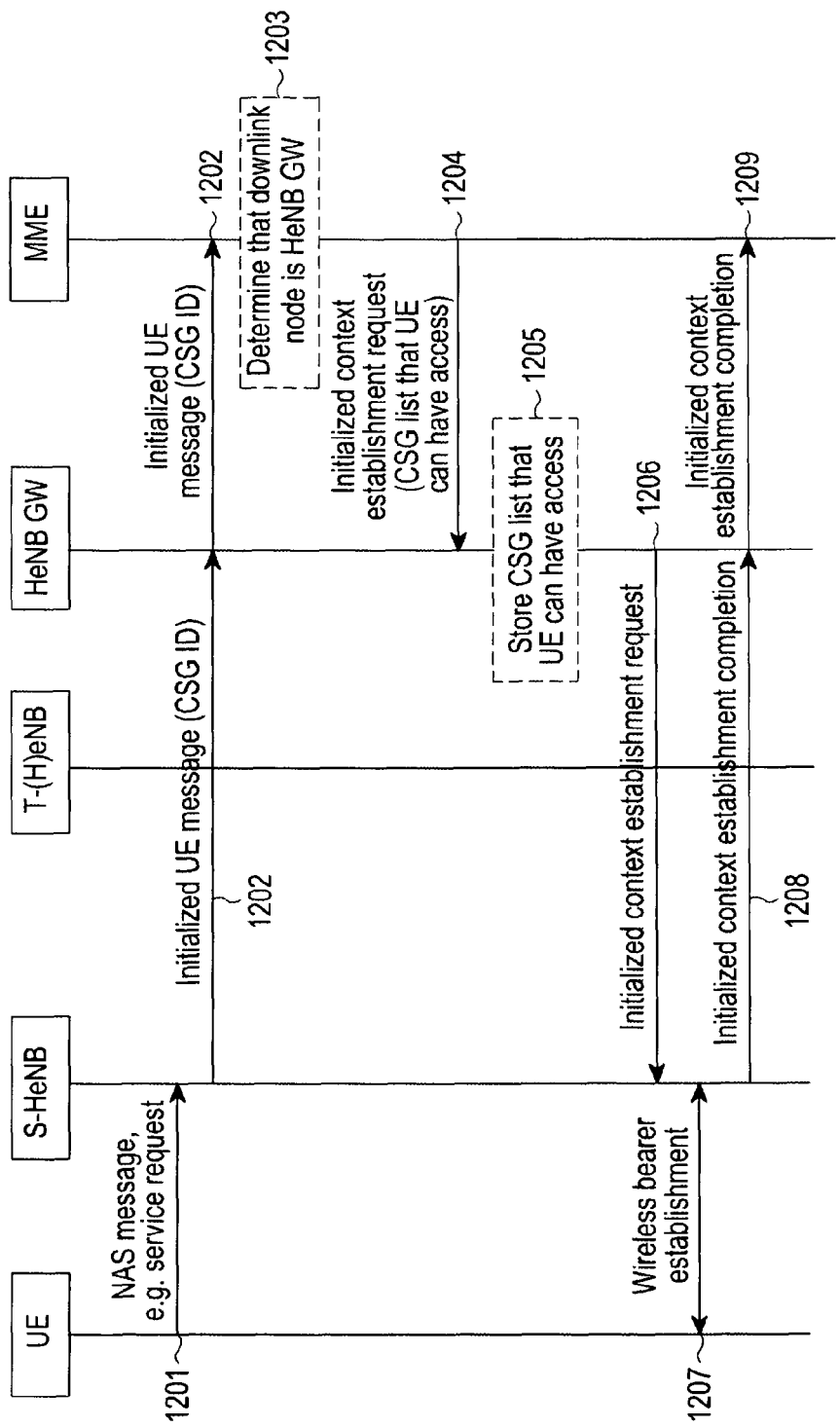
FIG. 12 is a schematic diagram of a process through which the HeNB GW obtains CSG list information that the UE is allowed to have access from an MME according to an embodiment of the present invention.

Step 902: The HeNB GW performs an access control for the UE. In order to perform the access control for the UE, the HeNB GW receives a list of CSGs ("CSG list") to which the UE can have access from the MME. A process for the HeNB GW to receive the CSG list from the MME is as shown in FIG. 12. The HeNB GW checks whether the CSG identifier of the destination cell is in the CSG list. If the destination cell is of the closed type and the CSG identifier of the destination cell is in the CSG list, the UE is allowed to have access. If it is not in the CSG list, the UE is refused to have access. For the hybrid type, the HeNB GW has the information on whether the UE is a member be included in an S1 Access Protocol (S1AP) handover request message transmitted to the T-(H)eNB.

The HeNB GW transmits the S1AP handover request message to the T-(H)eNB, and the HeNB GW finds the corresponding destination HeNB according to the identifier of the destination cell in the X2AP handover request message of Step 901. The $K_{eNB}*$ and the NCC received from the S-eNB are included in the S1AP handover request message. The HeNB GW sets a Next Hop (NH) parameter in the S1AP handover request message as a certain invalid value or an arbitrary value.

Step 903: The T-(H)eNB takes the $K_{eNB}^*$ as a new addition (i.e Encryption) key with the UE and allocates the resource, and the T-(H)eNB ignores the NH value in the S1AP handover request message. The T-(H)eNB transmits an S1AP handover request acknowledgement message to the HeNB GW.

Step 904: The HeNB GW transmits an X2AP handover request acknowledgement message to the S-eNB.

Step 905: The S-eNB transmits the handover command (which can also be referred to as RRC connection reconfiguration and also applies for the following) message to the UE.

Step 906: The UE transmits the handover acknowledgement (which can also be referred to as RRC connection reconfiguration completion and also applies for the following) message to the T-(H)eNB.

Step 907: The T-(H)eNB transmits an S1AP handover notification message to the HeNB GW.

Step 908: The HeNB GW transmits an S1AP path switch request message to the MME.

Step 909: The MME transmits an S1AP path switch request acknowledgement message to the HeNB GW.

Step 910: The HeNB GW transmits an X2AP resource release message to the S-eNB.

Figure 10:
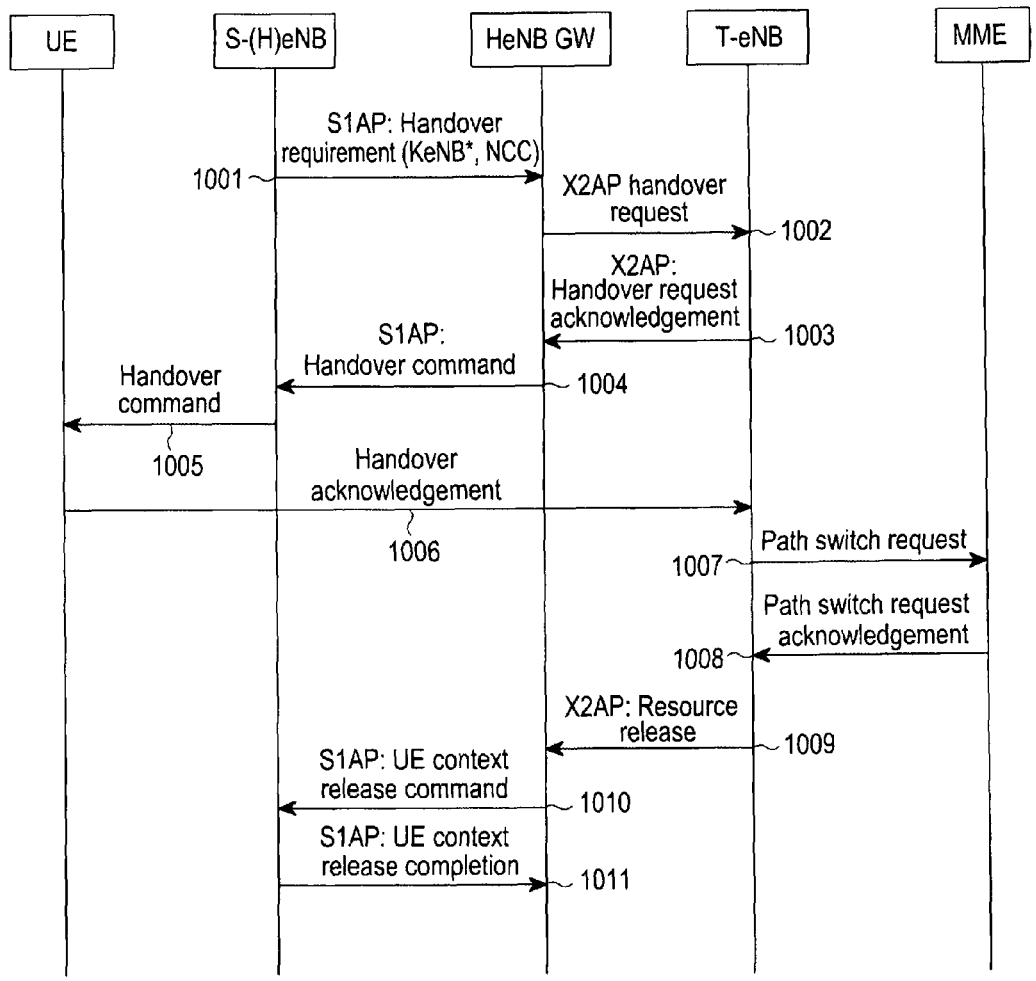
FIG. 10 is a schematic diagram of another process for performing the X2 handover using the GW according to an embodiment of the present invention.

FIG. 10 illustrates another process for performing the X2 handover using the GW according to an embodiment of the present invention.

Step 1001: The S-(H)eNB, as the source eNB or HeNB, makes the handover decision. The S-(H)eNB transmits an S1AP handover requirement message to the HeNB GW. The message includes the $K_{eNB}^*$ and the NCC. The S-(H)eNB calculates the $K_{eNB}^*$ according to a current $K_{eNB}$ or a new NH, the PCI of the destination cell, and the frequency, and such. Where the $K_{eNB}$ represents a key used to secure a communication between the UE and the S-(H)eNB. The calculation for the $K_{eNB}^*$ is substantially the same as the existing one (referring to 3GPP TS33.401, which is hereby incorporated by reference). The S1AP handover requirement message includes the CSG identifier of the destination cell and the access pattern of the destination cell.

Step 1002: The HeNB GW performs an access control for the UE. In order to perform the access control for the UE, the HeNB GW receives a CSG list that the UE can have access from the MME. A process for the HeNB GW to receive the CSG list from the MME is as shown in FIG. 12. The HeNB GW determines whether the CSG identifier of the destination cell is in the CSG list. If the destination cell is of the closed type and the CSG identifier of the destination cell is in the CSG list, the UE is allowed to have access. If it is not in the CSG list, the UE is refused access. For the destination cell of the hybrid type, the HeNB GW has the information on whether the UE is a member be included in an X2AP handover request message transmitted to the T-eNB as the destination eNB.

The HeNB GW transmits the X2AP handover request message to the T-eNB. The message includes the $K_{eNB}^*$ and the NCC received from the S-(H)eNB. The message may also includes the CSG identifier of the destination cell and the information on whether the UE is a member. The information on whether the UE is a member is an optional information element and, for example, exists only when the destination cell is of the hybrid type.

Step 1003: The T-eNB allocates the resource, and the T-eNB takes the $K_{eNB*}$ as a new encryption key with the UE. The T-eNB transmits an X2AP handover request acknowledgement message to the HeNB GW.

Step 1004: The HeNB GW transmits an S1AP handover command message to the S-(H)eNB.

Step 1005: The S-(H)eNB transmits the handover command message to the UE.

Step 1006: The UE transmits the handover acknowledgement message to the T-eNB.

Step 1007: The T-eNB transmits a path switch request message to the MME.

Step 1008: The MME transmits a path switch request acknowledgement message to the T-eNB.

Step 1009: The T-eNB transmits the X2AP resource release message to the HeNB GW.

Step 1010: The HeNB GW transmits an S1AP UE context release command message to the S-(H)eNB.

Step 1011: The S-(H)eNB transmits an S1AP UE context release completion message to the HeNB GW.

Figure 11:
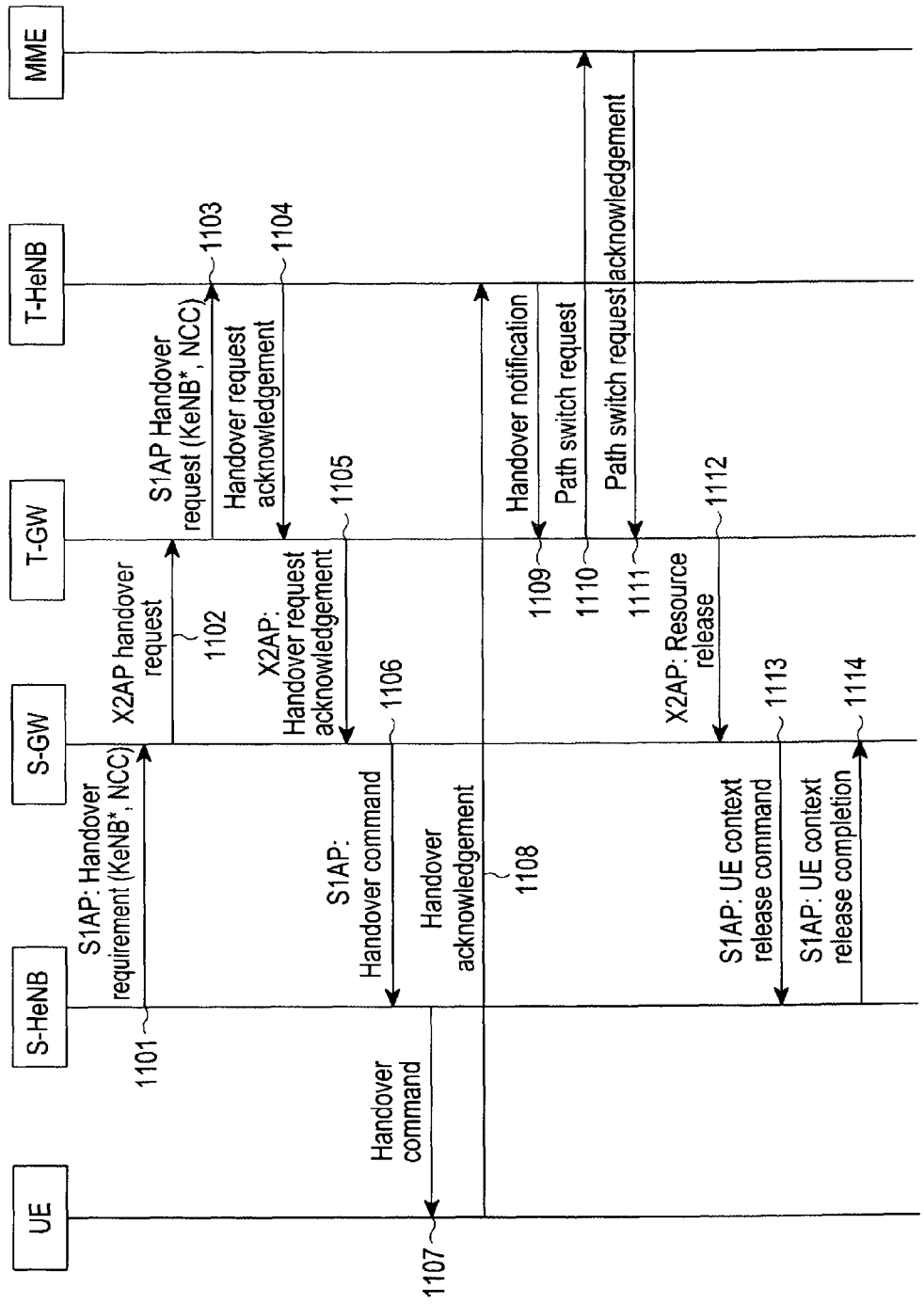
FIG. 11 is a schematic diagram of yet another process for performing the X2 handover using the GW according to an embodiment of the present invention.

FIG. 11 illustrates yet another process for performing the X2 handover through the GW according to an embodiment of the present invention.

Step 1101: The S-(H)eNB, as the source eNB or HeNB, makes the handover decision. The S-(H)eNB transmits an S1AP handover requirement message to the S-GW as the source HeNB GW. The S1AP handover requirement message includes the $K_{eNB}^*$ and the NCC. The S-(H)eNB calculates the $K_{eNB}^*$ according to a current $K_{eNB}$ or a new NH, the PCI of the destination cell, and the frequency, and such. The calculation for the $K_{eNB}^*$ is the same as the existing one (referring to TS33.401). The S1AP handover requirement message includes the CSG identifier of the destination cell and the access pattern (e.g. hybrid) of the destination cell.

Step 1102: The S-(H)eNB GW performs an access control for the UE. In order to perform the access control for the UE, the S-GW receives a CSG list that the UE is allowed to access from the MME. A process for the HeNB GW to receive the CSG list from the MME is as shown in FIG. 12. The S-GW checks whether the CSG identifier of the destination cell is in the CSG list. If the destination cell is of the closed type and the CSG identifier of the destination cell is in the CSG list, the UE is allowed to have access. If it is not in the CSG list, the UE is refused to have access. For the destination cell of the hybrid type, the S-GW has the information on whether the UE is a member be included in an X2AP handover request message transmitted to the T-HeNB as the destination HeNB.

The S-GW transmits the X2AP handover request message to the T-GW as the destination HeNB GW. The X2AP handover request message includes the $K_{eNB}^*$ and the NCC received from the S-(H)eNB. The X2AP handover request message includes the CSG identifier of the destination cell and the information on whether the UE is a member. The information on whether the UE is the member is an optional information element and, for example, exists only when the destination cell is of the hybrid type.

Step 1103: The T-GW transmits the S1AP handover request message to the T-HeNB. The S1AP handover request message includes the $K_{eNB}^*$ and the NCC received from the S-(H)eNB GW. The T-GW sets an NH in the S1AP handover request message as a certain invalid value or an arbitrary value.

Step 1104: The T-HeNB allocates the resource, and the T-HeNB takes the $K_{eNB}^*$ as a new encryption key with the UE. The T-HeNB ignores the NH value in the S1AP handover request message of step 1103. The T-HeNB transmits the handover request acknowledgement message to the T-GW.

Step 1105: The T-GW transmits the X2AP handover request acknowledgement message to the S-GW.

Step 1106: The S-GW transmits the S1AP handover command message to the S-(H)eNB.

Step 1107: The S-(H)eNB transmits the handover command message to the UE.

Step 1108: The UE transmits the handover acknowledgement message to the T-HeNB.

Step 1109: The T-HeNB transmits the S1AP handover notification message to the T-GW.

Step 1110: The T-GW transmits the path switch request message to the MME.

Step 1111: The MME transmits the path switch request acknowledgement message to the T-GW.

Step 1112: The T-GW transmits the X2AP resource release message to the S-GW.

Step 1113: The S-GW transmits the S1AP UE context release command message to the S-(H)eNB.

Step 1114: The S-(H)eNB transmits the S1AP UE context release completion message to the S-GW.

FIG. 12 illustrates a process through which the HeNB GW obtains CSG list of the CSGs to which the UE is allowed access from the MME according to an embodiment of the present invention.

Step 1201: The UE transmits a Non-Access Stratum (NAS) message, e.g. an attach or a service request, to the S-(H)eNB as the source eNB or HeNB.

Step 1202: The S-(H)eNB transmits the NAS message to the HeNB GW through the initialized UE message of the S1AP message. If the cell accessed by the UE is of the closed type or the hybrid type, the CSG ID (CSG identifier) is included in the initialized UE message of the S1AP message. The HeNB GW transmits the initialized UE message of the S1AP message to the MME, where the CSG ID is included in the initialized UE message of the S1AP message.

Step 1203: The MME determines that a downlink node is the HeNB GW. This step is optional. Specifically, various methods by which the MME may determine whether the downlink node is the HeNB GW includes the following.

According to a first method, the MME differentiates the type of the entity according to the identifier of the entity of the downlink node, e.g. the code of the identifier of the eNB, the identifier of the HeNB, or the identifier of the HeNB GW. For example, the identifier of the eNB is initialized with '00', the identifier of the HeNB is initialized with '01', and the identifier of the HeNB GW is initialized with '10'.

According to a second method, in the S1 establishment process, a supported Tracking Area (TA) list is included in the S1 establishment request message received by the MME from the downlink node, and the HeNB GW supports a particular TA list. According to the particular TA list, the MME knows that the downlink node is the HeNB GW.

According to a third method, in the S1 establishment process, a base station type indication information is included in the S1 establishment request message transmitted by the HeNB GW to the MME, to indicate that the downlink node is the HeNB GW.

According to a fourth method, the base station type indication information is included in the initialized UE message transmitted by the HeNB GW to the MME to indicate that the downlink node is the HeNB GW. Also, the base station type indication information is used for indicating that the downlink node is the HeNB or the macro base station.

The method for the MME to determine that the downlink node is the HeNB GW may be any of the methods described above, but is not limited to these methods. This section is not essential to the understanding of the present invention, and thus is not discussed in further detail.

Step 1204: The MME transmits an initialized context establishment request message to the HeNB GW, where the information element of the CSG list that the UE can have access is included in the initialized context establishment request message. Corresponding to each CSG identifier, a valid time that the UE can access the CSG is also included in the initialized context establishment request.

Step 1205: The HeNB GW stores the CSG list that the UE can have access into the context of the UE.

Step 1206: The HeNB GW transmits an initialized context establishment request message to the S-(H)eNB.

Step 1207: The S-(H)eNB establishes a wireless bearer with the UE.

Step 1208: The S-(H)eNB transmits an initialized context establishment completion message to the HeNB GW.

Step 1209: The HeNB GW transmits the initialized context establishment completion message to the MME.

Figure 13:
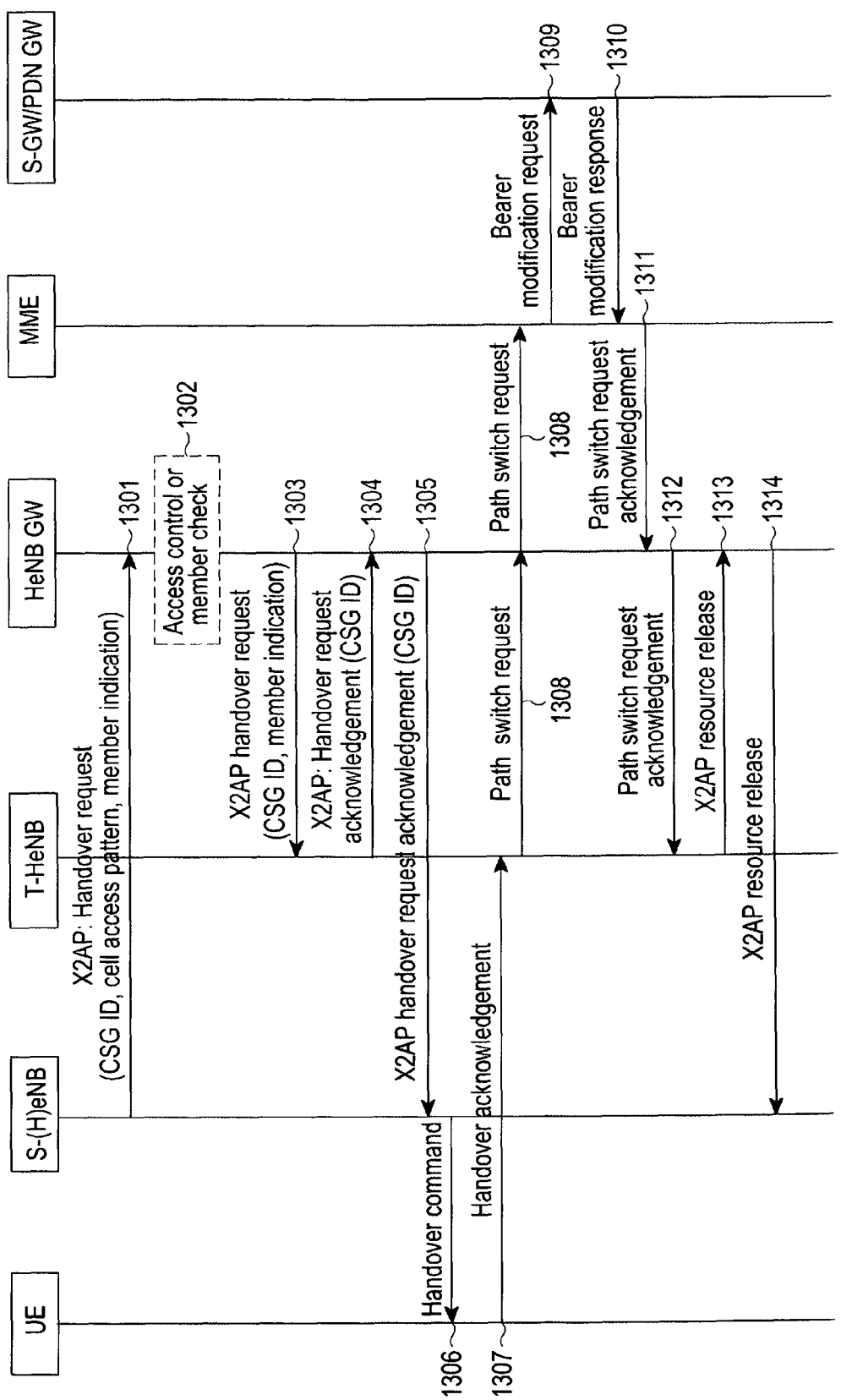
FIG. 13 is a schematic diagram of a possible handover process when handover signaling between the HeNB and the HeNB GW is an X2 protocol according to an embodiment of the present invention.

The architecture of the X2 protocol corresponds to the handover signaling between the HeNB and the HeNB GW. FIG. 13 illustrates a handover procedure according to an embodiment of the present invention. The source base station is the eNB, or the HeNB accessing the same HeNB GW as the destination HeNB.

Step 1301: The S-(H)eNB, as the source eNB or HeNB, transmits the X2AP handover request message to the HeNB GW. The X2AP handover request message includes the information elements of the CSG identifier of the destination cell and the access pattern of the destination cell. The information elements are optional. If the destination cell is of the hybrid type and has the same CSG identifier as the source cell, the X2AP handover request message also includes information on whether the UE is a subscription member or a non-subscription member of the destination cell.

Step 1302: The HeNB GW performs an access control or a member check for the UE. If the destination cell is of the CSG type and the UE is not a member of the CSG, the HeNB GW transmits a failure message to the S-(H)eNB. If the destination cell is of the hybrid type, the HeNB GW checks whether the UE is a member of the CSG, and step 1303 is executed. If the HeNB GW has already obtained the CSG identifier of the destination cell from the destination HeNB (e.g. the CSG identifier of the destination cell is obtained through the S1 establishment or the X2 establishment between the T-HeNB and the HeNB GW), the HeNB GW checks whether the CSG identifier received from the S-(H)eNB is the same as the CSG identifier of the destination cell. If the CSG identifier is different from the CSG identifier of the destination cell and the destination cell is the CSG type, the HeNB GW transmits the failure message to the S-(H)eNB. If the CSG identifier is different from the CSG identifier of the destination cell, and the destination cell is the hybrid type, step 1303 is executed, and the actual CSG identifier of the destination cell is notified to the S-(H)eNB in step 1305. If the X2 handover through the GW is used for only the destination cell of the opened pattern, or the hybrid pattern or the CSG pattern such that the source and the destination cells have the same CSG identifier, the access control or the member check is not required. Also, if the X2 handover through the GW is used for the destination cell of the hybrid pattern of any CSG identifier, the HeNB GW may check whether the UE is a subscription member of the destination cell according to the CSG identifier of the destination cell.

Step 1303: The HeNB GW transmits the X2AP handover request message to the destination HeNB. The X2AP handover request message includes the CSG identifier of the destination cell. The X2AP handover request also includes member indication information. The member indication information indicates whether the UE is a subscription member or a non-subscription member. If the function of checking the CSG identifier received from the S-(H)eNB and the CSG identifier of the destination cell is completed at the HeNB GW, the X2AP handover request message does not need to include the CSG identifier of the destination cell.

Step 1304: The T-HeNB allocates the resource and transmits the X2AP handover request acknowledgement message to the HeNB GW. If the destination cell is the CSG type and the CSG identifier transmitted from the S-(H)eNB is different from the CSG identifier broadcasted by the destination cell, the T-HeNB transmits a handover preparation failure message to the HeNB GW. The actual CSG identifier of the destination cell is included in the handover preparation failure message. The HeNB GW transmits the handover preparation failure message to the S-(H)eNB. If the destination cell is the hybrid type and the CSG identifier transmitted from the S-(H)eNB is different from the CSG identifier broadcasted by the destination cell, the T-HeNB causes the actual CSG identifier of the destination cell to be included in the handover request acknowledgement message. The function of checking the CSG identifier transmitted from the S-(H)eNB and the CSG identifier of the destination cell can also be completed at the HeNB GW. At this time, it is possible that the CSG identifier of the destination cell does not need to be included in the X2AP handover request message.

Step 1305: The HeNB GW transmits the handover request acknowledgement message to the S-(H)eNB. The message includes the actual CSG identifier of the destination cell.

Step 1306: The S-(H)eNB transmits the handover command message to the UE.

Step 1307: The UE transmits the handover acknowledgement message to the T-HeNB.

Step 1308: The T-HeNB transmits the path switch request message to the HeNB GW, where the path switch request message includes the CSG identifier of the destination cell. The HeNB GW transmits the path switch request message to the MME.

Step 1309: The MME transmits the bearer modification request message to the S-GW/PDN GW. If the request report requirement is met, the bearer modification request message includes user position information and/or user CSG information. The user position information includes the CSG ID, the access pattern, and the information on whether the UE is a member.

Step 1310: The S-GW/PDN GW transmits the bearer modification response message to the MME.

Step 1311: The MME transmits the path switch request acknowledgement message to the HeNB GW.

Step 1312: The HeNB GW transmits the path switch request acknowledgement message to the T-HeNB.

Step 1313: The T-HeNB transmits the X2AP resource release message to the HeNB GW.

Step 1314: The HeNB GW transmits the X2AP resource release message to the S-(H)eNB.

Figure 14:
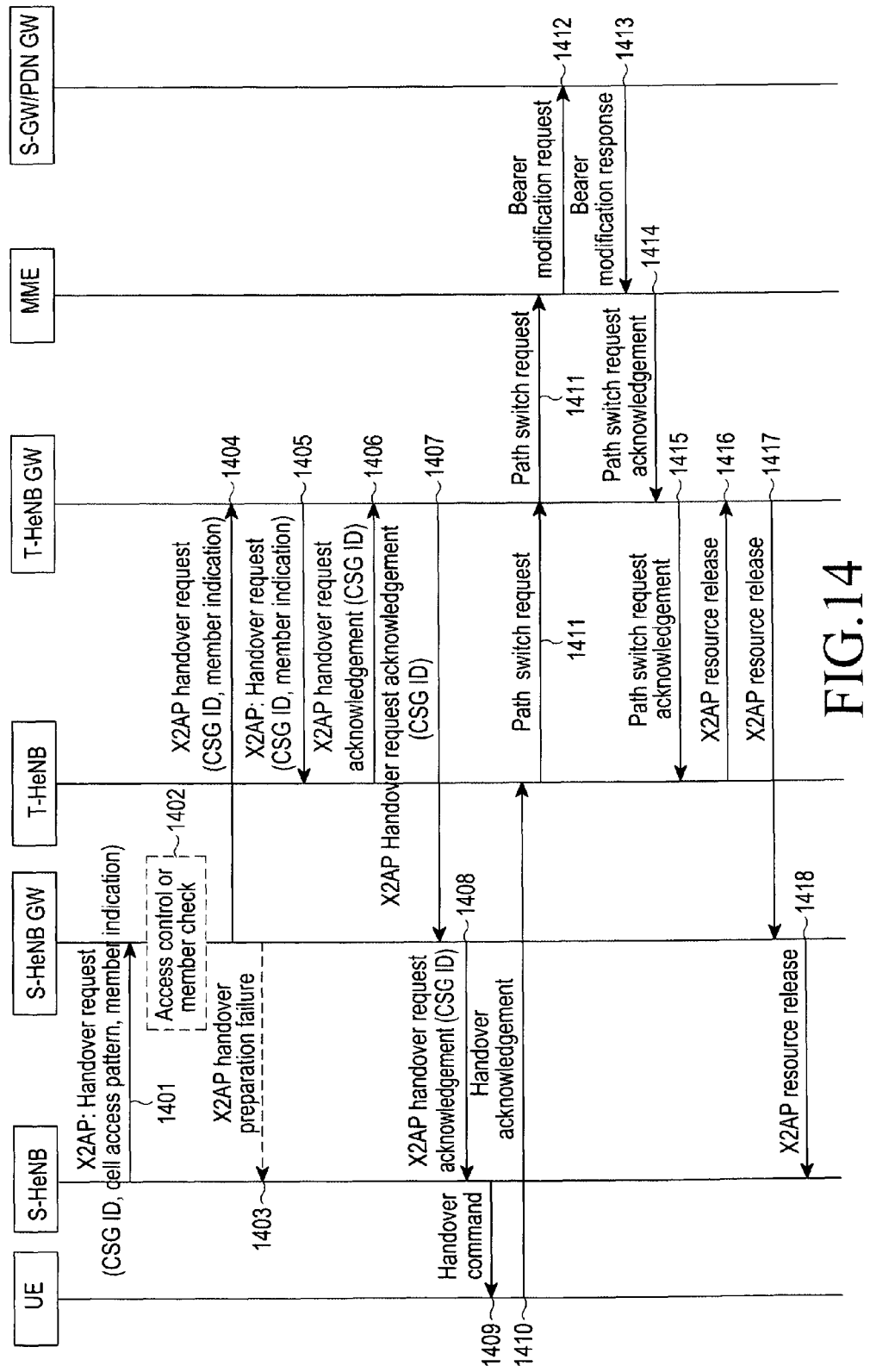
FIG. 14 is a schematic diagram of another possible handover process when the handover signaling between the HeNB and the HeNB GW is the X2 protocol according to an embodiment of the present invention.

The architecture of the X2 protocol corresponds to the handover signaling between the HeNB and the HeNB GW. FIG. 14 illustrates a handover procedure according to an embodiment of the present invention. The source base station is the eNB or the HeNB accessing the same HeNB GW as the destination HeNB.

Step 1401: The S-HeNB, as the source HeNB, transmits the X2AP handover request message to the S-HeNB GW, the source HeNB GW. The X2AP handover request message includes the CSG identifier of the destination cell and the access pattern of the destination cell. The information elements are optional. If the destination cell is of the hybrid type and has the same CSG identifier as the source cell, the X2AP handover request message also includes information on whether the UE is a subscription member or a non-subscription member of the destination cell.

Step 1402: The S-HeNB GW performs an access control or a member check for the UE. If the destination cell is the CSG type and the UE is not a member of the CSG, step 1403 is executed. If the destination cell is the hybrid type, the S-HeNB GW checks whether the UE is a member, and step 1404 is executed. If the X2 handover through the GW is used for only the destination cell of the opened pattern, or the hybrid pattern or the CSG pattern such that that the source and the destination cells have the same CSG identifier, the access control or member check is not required. If the X2 handover through the GW is also used for the destination cell of the hybrid pattern of any CSG identifier, the S-HeNB GW may check whether the UE is a subscription member of the destination cell according to the CSG identifier of the destination cell.

Step 1403: The S-HeNB GW transmits the X2AP handover preparation failure message to the S-HeNB.

Step 1404: The S-HeNB GW transmits the X2AP handover request message to the T-HeNB GW (the destination HeNB GW). The X2AP handover request message includes the CSG identifier of the destination cell and member indication information. The member indication information indicates whether the UE is a subscription member or a non-subscription member. The function of checking the CSG identifier from the S-HeNB and the CSG identifier of the destination cell can also be completed at the S-HeNB GW, and at this time, the CSG identifier does not need to be included in the X2AP handover request message.

Step 1405: The T-HeNB GW transmits the X2AP handover request message to the T-HeNB. The X2AP handover request message includes the CSG identifier of the destination cell and member indication information. The member indication information indicates whether the UE is a subscription member or a non-subscription member. The function of checking the CSG identifier transmitted from the S-HeNB and the CSG identifier of the destination cell can also be completed at the S-HeNB GW, and at this time, the CSG identifier does not need to be included in the X2AP handover request message.

Step 1406: The T-HeNB allocates the resource, and transmits the X2AP handover request acknowledgement message to the T-HeNB GW. If the destination cell is the CSG type and the CSG identifier transmitted from the S-HeNB is different from the CSG identifier broadcasted by the destination cell, the destination cell transmits a handover preparation failure message to the T-HeNB GW. The actual CSG identifier of the destination cell is included in the handover preparation failure message. The T-HeNB GW transmits the handover preparation failure message to the S-HeNB GW, and the S-HeNB GW transmits the handover preparation failure message to the S-HeNB. If the destination cell is the hybrid type and the CSG identifier transmitted from the S-HeNB is different from the CSG identifier broadcasted by the destination cell, the T-HeNB causes the actual CSG identifier of the destination cell to be included in the handover request acknowledgement message. The function of checking the CSG identifier transmitted from the S-HeNB and the CSG identifier of the destination cell may be completed at the S-HeNB GW or the T-HeNB GW.

Step 1407: The T-HeNB GW transmits the X2AP handover request acknowledgement message to the S-HeNB GW. The function of checking the CSG identifier transmitted from the S-HeNB and the CSG identifier of the destination cell may be completed at the S-HeNB GW or the T-HeNB GW. Corresponding to the situation in which the function of checking whether the CSG identifier transmitted from the S-HeNB is consistent with the CSG identifier of the destination cell is completed at the T-HeNB GW, the X2AP handover request acknowledgement message includes the actual CSG identifier of the destination cell. The information element is optional.

Step 1408: The S-HeNB GW transmits the handover request acknowledgement message to the S-HeNB. The handover request acknowledgement message includes the actual CSG identifier of the destination cell, and the information element is optional.

Step 1409: The S-HeNB transmits the handover command message to the UE.

Step 1410: The UE transmits the handover acknowledgement message to the T-HeNB.

Step 1411: The T-HeNB transmits the path switch request message to the T-HeNB GW, where the path switch request message includes the CSG identifier of the destination cell. The T-HeNB GW transmits the path switch request message to the MME. If the destination cell is the opened type, it is not required to include the CSG identifier.

Step 1412: The MME transmits the bearer modification request message to the S-GW/PDN GW. If the request report requirement is met, the bearer modification request message includes user position information and/or user CSG information. The user position information includes the CSG ID, the access pattern, and the information on whether the UE is a member.

Step 1413: The S-GW/PDN GW transmits the bearer modification response message to the MME.

Step 1414: The MME transmits the path switch request acknowledgement message to the T-HeNB GW.

Step 1415: The T-HeNB GW transmits the path switch request acknowledgement message to the T-HeNB.

Step 1416: The T-HeNB transmits the X2AP resource release message to the T-HeNB GW.

Step 1417: The T-HeNB GW transmits the X2AP resource release message to the S-HeNB GW.

Step 1418: The S-HeNB GW transmits the X2AP resource release message to the S-HeNB.

It can be seen from the above that, with the method for performing the X2 handover using the GW provided by embodiments of the present invention, the handover can be implemented on only the premise that the HeNB needs to support the S1 protocol, a cost of the HeNB is decreased, an interaction of the handover process with the core network is reduced, and an influence on the core network by the handover process is decreased.

Figure 15:
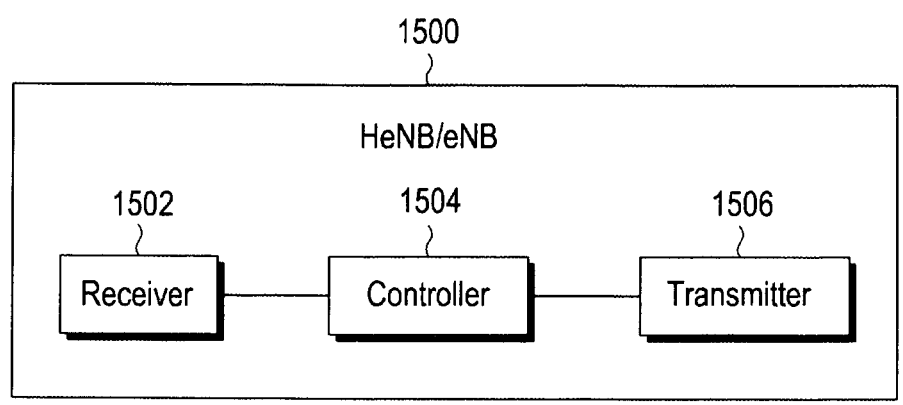
FIG. 15 is a block diagram of an (H)eNB according to an embodiment of the present invention.

FIG. 15 is a block diagram of an (H)eNB according to an embodiment of the present invention. The (H)eNB 1500 represents an HeNB or eNB, and operates as one of the source (H)eNB and the target (H)eNB. The (H)eNB 1500 includes a transmitter 1506, a receiver 1502 and a controller 1504 as shown in FIG. 15.

The transmitter 1506 performs message transmission operation in the S1 interface establishment process, the X2 interface connection process, and the handover process described above. The receiver 1502 performs message reception operation in the S1 interface establishment process, the X2 interface connection process, and the handover process described above. The controller 1504 controls the receiver and the transmitter, and controls all operation of the (H)eNB Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a handover by a source base station, the method comprising:
   transmitting a handover requirement message, for a handover to a destination base station of a user equipment (UE), to a source base station gateway;
   when a handover command message indicating performing of the handover to the destination base station of the UE is received from the source base station gateway, transmitting the handover command message to the UE;
   when a UE context release command message is received from the source base station gateway, releasing a context of the UE; and
   transmitting a UE context release completion message to the source base station gateway,
   wherein the handover requirement message comprises a Next-hop Chaining Counter (NCC) and an encryption key for a communication between the UE and the destination base station, and
   wherein the NCC and the encryption key are transmitted to the destination base station from a destination base station gateway, after the NCC and the encryption key are delivered to the destination base station gateway from the source base station gateway.

2. The method of claim 1, wherein the handover requirement message further comprises a Closed Subscriber Group (CSG) identifier of the destination base station and access pattern information of the destination base station.

3. The method of claim 1, further comprising:
   transmitting to the source base station gateway an interface establishment request message that comprises information of a serving cell managed by the source base station; and
   setting an interface for a communication with the base source base station gateway in response to receiving an interface response message,
   wherein transmitting the handover requirement message to the source base station gateway comprises transmitting the handover requirement message to the source base station gateway using the interface.

4. The method of claim 3, wherein the information of the serving cell comprises at least one of a Physical Cell Identifier (PCI), an Evolved Universal Terrestrial Radio Access Network (E-UTRAN) Cell Global Identifier (ECGI), a Tracking Area Code (TAC), and at least one broadcasted Public Land Mobile Network (PLMN) identifier.

5. The method of claim 4, wherein the information of the serving cell further comprises at least one of information on an antenna port amount of the source base station and Physical Random Access Channel (PRACH) configuration information.

6. The method of claim 1, further comprising generating the encryption key for the communication between the UE and the destination base station based on at least one of a current encryption key for a communication between the UE and the source base station, a physical cell identifier (PCI) of a destination cell managed by the destination base station, and a frequency.

7. A method for performing a handover by a destination base station, the method comprising:
   receiving a handover request message from a destination base station gateway, the handover request message for requesting a handover to the destination base station of a user equipment (UE) receiving a service from a source base station;

allocating a resource to the UE;

transmitting a handover request acknowledgement message to the destination base station gateway, the handover request acknowledgement message indicating that the handover to the destination base station of the UE is possible; and when a handover acknowledgement message is received from the UE, the handover acknowledgement message indicating that the handover to the destination base station of the UE is to be performed, transmitting to the destination base station gateway a handover notification message for notifying the handover of the UE, wherein the handover request message comprises a Next-hop Chaining Counter (NCC) of the source base station and an encryption key for a communication between the UE and the destination base station, and wherein the NCC and the encryption key are transmitted to the destination base station gateway from a source base station gateway, after the NCC and the encryption key are delivered to the source base station gateway from the source base station.

8. The method of claim 7, further comprising:

transmitting to the destination base station gateway an interface establishment request message comprising information of a serving cell managed by the destination base station; and setting an interface for a communication with the destination base station gateway upon receiving an interface establishment response message, wherein receiving the handover request message from the destination base station gateway comprises receiving the handover request message from the destination base station gateway using the interface set for a communication with the destination base station gateway.

9. The method of claim 8, wherein the information of the serving cell comprises at least one of a Physical Cell Identifier (PCI), an Evolved Universal Terrestrial Radio Access Network (E-UTRAN) Cell Global Identifier (ECGI), a Tracking Area Code (TAC), and at least one broadcasted Public Land Mobile Network (PLMN) identifier.

10. The method of claim 9, wherein the information of the serving cell further comprises at least one of information on an antenna port amount of the destination base station and Physical Random Access Channel (PRACH) configuration information.

11. A source base station comprising:

a receiver configured to receive a handover command message, indicating a performing of a handover to a destination base station of a user equipment (UE), from a source base station gateway, and receive a UE context release command message from the source base station gateway;

a controller configured to release a context of the UE when the UE context release command message is received from the source base station gateway; and a transmitter configured to transmit to the source base station gateway a handover requirement message for the handover to the destination base station of the UE, transmit the handover command message to the UE when the handover command message is received from the source base station gateway, and transmit to the source base station gateway a UE context release completion message representing that the context of the UE is released when the context of the UE is released according to a reception of the UE context release command message, wherein the handover requirement message comprises a Next-hop Chaining Counter (NCC) and an encryption key for a communication between the UE and the destination base station, and wherein the NCC and the encryption key are transmitted to the destination base station from a destination base station gateway, after the NCC and the encryption key are delivered to the destination base station gateway from the source base station gateway.

12. The source base station of claim 11, wherein the handover requirement message further comprises a Closed Subscriber Group (CSG) identifier of the destination base station and access pattern information of the destination base station.

13. The source base station of claim 11, wherein the transmitter is further configured to transmit to the source base station gateway an interface establishment request message including information of a serving cell managed by the source base station, and transmit the handover requirement message to the source base station gateway using an interface set for a communication with the source base station gateway, and wherein the controller is further configured to set the interface based on the interface establishment response message.

14. The source base station of claim 13, wherein the information of the serving cell comprises at least one of a Physical Cell Identifier (PCI), an Evolved Universal Terrestrial Radio Access Network (E-UTRAN) Cell Global Identifier (ECGI), a Tracking Area Code (TAC), and at least one broadcasted Public Land Mobile Network (PLMN) identifier.

15. The source base station of claim 14, wherein the information of the serving cell further comprises at least one of information on an antenna port amount of the source base station and Physical Random Access Channel (PRACH) configuration information.

16. The source base station of claim 11, wherein controller is further configured to generate the encryption key for the communication between the UE and the destination base station based on at least one of a current encryption key for a communication between the UE and the source base station, a physical cell identifier (PCI) of a destination cell managed by the destination base station, and a frequency.

17. A destination base station comprising:

a receiver configured to receive a handover request message from a destination base station gateway, the handover request message representing a message for requesting a handover to the destination base station of a user equipment (UE) receiving a service from a source base station, and receive a handover acknowledgement message from the UE, the handover acknowledgement message indicating that the handover to the destination base station of the UE is to be performed;

a controller configured to allocate a resource the UE when the handover request message is received; and a transmitter configured to transmit a handover request acknowledgement message to the destination base station gateway when the resource is allocated to the UE, the handover request acknowledgement message indicating that the handover to the destination base station of the UE is possible, and transmit to the destination base station gateway a handover notification message for notifying the handover of the UE when the handover acknowledgement message is received, wherein the handover request message comprises a Next-hop Chaining Counter (NCC) of the source base station and an encryption key for a communication between the UE and the destination base station, and wherein the NCC and the encryption key are transmitted to the destination base station gateway from a source base station gateway, after the NCC and the encryption key are delivered to the source base station gateway from the source base station.

18. The destination base station of claim 17, wherein the transmitter is further configured to transmit to the destination base station gateway an interface establishment request message comprising information of a serving cell managed by the destination base station, the receiver is further configured to receive an interface establishment response message, and receive the handover request message from the destination base station gateway using an interface that is set for a communication with the destination base station gateway, and wherein the controller is further configured to set the interface based on the interface establishment response message.

19. The destination base station of claim 18, wherein the information of the serving cell comprises at least one of a Physical Cell Identifier (PCI), an Evolved Universal Terrestrial Radio Access Network (E-UTRAN) Cell Global Identifier (ECGI), a Tracking Area Code (TAC), and at least one broadcasted Public Land Mobile Network (PLMN) identifier.

20. The destination base station of claim 19, wherein the information of the serving cell further comprises at least one of information on an antenna port amount of the destination base station and Physical Random Access Channel (PRACH) configuration information.

* * * * *